US010974969B2

(12) United States Patent
Hu et al.

(10) Patent No.: US 10,974,969 B2
(45) Date of Patent: Apr. 13, 2021

(54) METHODS AND COMPOSITIONS FOR MICROWAVE CATALYTIC AMMONIA SYNTHESIS

(71) Applicants: West Virginia University, Morgantown, WV (US); Battelle Memorial Institute, Richland, WA (US); Florida State University Research Foundation, Inc., Tallahassee, FL (US); United States Department of Energy, Washington, DC (US)

(72) Inventors: Jianli Hu, Morgantown, WV (US); Dushyant Shekhawat, Morgantown, WV (US); Christina Wildfire, Fairmont, WV (US); Robert A. Dagle, Richland, WA (US); Hanjing Tian, Morgantown, WV (US); Albert Stiegman, Tallahassee, FL (US); Michael Spencer, Morgantown, WV (US); Victor Abdelsayed, Morgantown, WV (US); Mark D. Bearden, Kennewick, WA (US)

( * ) Notice: Subject to any disclaimer, the term of this patent is extended or adjusted under 35 U.S.C. 154(b) by 0 days.

(21) Appl. No.: 16/127,843

(22) Filed: Sep. 11, 2018

(65) Prior Publication Data
US 2020/0079656 A1 Mar. 12, 2020

(51) Int. Cl.
*C01C 1/04* (2006.01)
*B01J 23/46* (2006.01)
(Continued)

(52) U.S. Cl.
CPC .......... *C01C 1/0411* (2013.01); *B01J 8/0278* (2013.01); *B01J 8/0285* (2013.01); *B01J 19/126* (2013.01);
(Continued)

(58) Field of Classification Search
CPC .... C01C 1/0411; C01C 1/0417; B01J 23/462; B01J 21/04; B01J 23/02; B01J 23/10;
(Continued)

(56) References Cited

U.S. PATENT DOCUMENTS

| 4,600,571 A * | 7/1986 | McCarroll | C01C 1/0411 |
| | | | 423/363 |
| 2013/0039834 A1* | 2/2013 | Auner | C01C 1/0494 |
| | | | 423/359 |
| 2016/0175816 A1* | 6/2016 | Carpenter | B01J 23/745 |
| | | | 423/362 |

FOREIGN PATENT DOCUMENTS

JP 58060614 A * 4/1983 .............. B01J 19/12

OTHER PUBLICATIONS

Nakajima et al., "Synthesis of ammonia using microwave discharge at atmospheric pressure", Thin Solid Films 516 (2008) 4446-4451. (Year: 2008).*

(Continued)

*Primary Examiner* — Anthony J Zimmer
(74) *Attorney, Agent, or Firm* — Innovators Legal

(57) ABSTRACT

In one aspect, the disclosure relates to relates to heterogeneous catalysts useful for the synthesis of ammonia under microwave irradiation, processes for preparing the disclosed heterogeneous catalysts, and processes for synthesizing ammonia using the heterogeneous catalysts with microwave irradiation. In various aspects, the disclosed heterogeneous catalysts comprise: a metal selected from Group 7, Group 8, Group 9, Group 10, Group 11, or combinations thereof; a metal oxide support; and optionally a promoter material. This abstract is intended as a scanning tool for purposes of searching in the particular art and is not intended to be limiting of the present disclosure.

20 Claims, 19 Drawing Sheets

(51) Int. Cl.
  *B01J 21/04* (2006.01)
  *B01J 23/02* (2006.01)
  *B01J 23/10* (2006.01)
  *B01J 35/00* (2006.01)
  *B01J 8/02* (2006.01)
  *B01J 19/12* (2006.01)

(52) U.S. Cl.
  CPC ............... *B01J 21/04* (2013.01); *B01J 23/02* (2013.01); *B01J 23/10* (2013.01); *B01J 23/462* (2013.01); *B01J 35/0013* (2013.01); *B01J 35/0066* (2013.01); *C01C 1/0417* (2013.01); *B01J 2219/0879* (2013.01); *B01J 2219/1206* (2013.01)

(58) Field of Classification Search
  CPC .... B01J 35/0013; B01J 8/0278; B01J 8/0285; B01J 19/126; B01J 35/0066; B01J 2219/0879; B01J 2219/1206
  See application file for complete search history.

(56) References Cited

OTHER PUBLICATIONS

Patil et al., "Plasma N2-fixation: 1900-2014", Catalysis Today 256 (2015) 49-66. (Year: 2015).*
Hong et al., "Plasma Catalysis as an Alternative Route for Ammonia Production: Status, Mechanisms, and Prospects for Progress", ACS Sustainable Chem. Eng., 2018, 6, 15-31. Published online Nov. 15, 2017. (Year: 2017).*
Peng et al., "Atmospheric Pressure Ammonia Synthesis Using Non-thermal Plasma Assisted Catalysis", Plasma Chem Plasma Process (2016) 36: 1201-1210. (Year: 2016).*

* cited by examiner

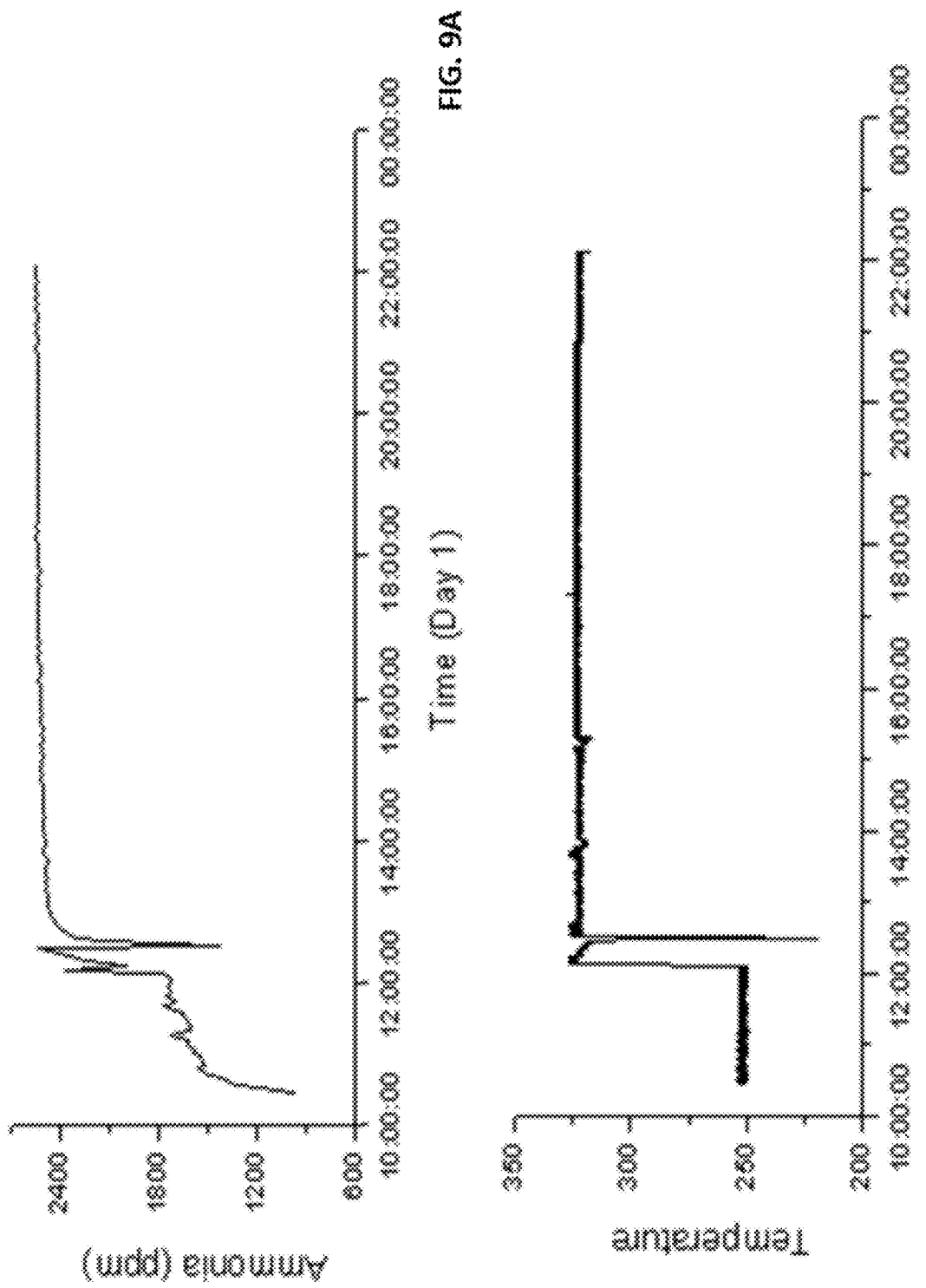

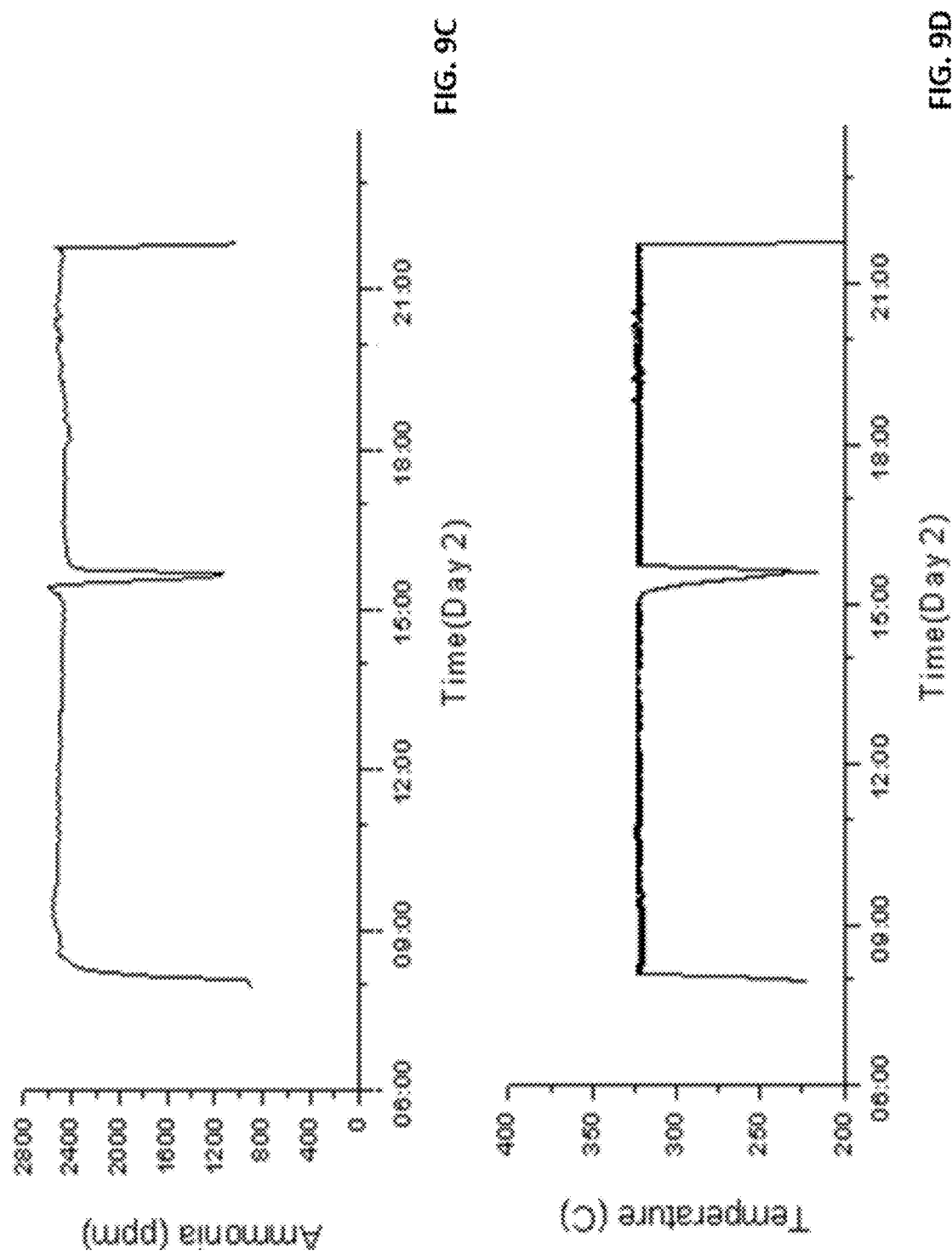

METHODS AND COMPOSITIONS FOR MICROWAVE CATALYTIC AMMONIA SYNTHESIS

STATEMENT REGARDING FEDERALLY SPONSORED RESEARCH

This disclosure was made with U.S. Government support under Contract number DE-AR0000807, awarded by the U.S. Department of Energy Advanced Research Projects Agency-Energy (ARPA-E). The U.S. government has certain rights in the disclosure.

BACKGROUND

Ammonia has become one of the most industrially important synthetic chemicals. For example, ammonia, which contains 82 percent nitrogen, is the main source for nitrogen in various types of fertilizers used in crop production used globally. In the chemical industry, ammonia is conventionally produced in large-scale plants via the Haber-Bosch (H-B) process. The industrial H-B process is a technology that consumes considerable energy—requiring high temperature (400-570° C.), high pressure (150-250 bar, or about 148-246 atm) and an effective catalyst (Fe promoted with $K_2O$ and $Al_2O_3$ as well as other metal oxides). Moreover, current ammonia plants are very large, e.g., producing 1000 ton/day ammonia.

It is estimated that current ammonia production, together with upstream $H_2$ production from steam reforming or coal gasification process consumes approximately 2% of world power generation. Importantly, 1.87 tons of $CO_2$ is released per ton of ammonia produced. In 2010, 245 million tons of $CO_2$ was released as a result of ammonia production, which is equivalent to 0.77% of the world total $CO_2$ emissions. The chemical industry has been trying to optimize the H-B process to decrease the amount capital and energy required. Although optimization of process conditions and catalysts have resulted in about 30% efficiency improvements, the H-B the process still accounts for 1-2% of global energy consumption.

Industry has also attempted to scale down the H-B process, for example, in order to take advantage of renewable energy resources. The current H-B synthesis of ammonia is too large for the deployable scale of renewables (ranging from 1-2 MW to 100-150 MW). If the conventional H-B process could be scaled down to about 100 ton/day, this would reduce the energy consumption to about 150 MW of renewable energy. At an energy consumption of about 150 MW, the energy requirement matches well with a single mid-size solar/wind farm or combination of several renewable sources. However, scaling the H-B process down to about 100 ton/day increases the production cost by a factor of 2 to 3.

Other industrial efforts to synthesize ammonia without the H-B approach, including electrochemical, biomimetic routes, and novel chemical looping processes, are all at the fundamental research level at this time. As reported, electrochemical approaches often yield only trace amounts of ammonia at modest current efficiencies, while biomimetic routes suffer from the requirement for liquid phase operation with slow mass transfer, often slow kinetics, and sometimes requirements for co-factors that are prohibitively expensive and/or complex to provide.

Accordingly, despite advances in the improving the efficiency of the H-B process and ammonia synthesis without the H-B process, there is still a need for an industrial ammonia synthesis process with improved energy efficiency, allows efficient pairing with renewable energy resources, reduced capital and operating costs. These needs and other needs are satisfied by the present disclosure.

SUMMARY

In accordance with the purpose(s) of the disclosure, as embodied and broadly described herein, the disclosure, in one aspect, relates to heterogeneous catalysts useful for the synthesis of ammonia using microwave irradiation, processes for preparing the disclosed heterogeneous catalysts, and processes for synthesizing ammonia at ambient pressures using hydrogen and nitrogen.

Disclosed are heterogeneous catalysts comprising: a metal selected from Group 7, Group 8, Group 9, Group 10, Group 11, or combinations thereof; wherein the metal is present in an amount from about 1 wt % to about 20 wt % based on the total weight of the heterogeneous catalyst; and a metal oxide support.

Also disclosed are heterogeneous catalysts comprising: ruthenium in an amount from about 1 wt % to about 20 wt % based on the total weight of the heterogeneous catalyst; and a metal oxide support.

Also disclosed are heterogeneous catalysts comprising: a metal selected from Group 7, Group 8, Group 9, Group 10, Group 11, or combinations thereof; wherein the metal is present in an amount from about 1 wt % to about 20 wt % based on the total weight of the heterogeneous catalyst; a promoter material in an amount of about 0.1 wt % to about 5 wt % based on the total weight of the heterogeneous catalyst; and a metal oxide support; wherein the promoter material comprises a Group I compound, a Group II compound, a lanthanide compound, or combinations thereof; and wherein when a combination of promoter materials is present, each is present in an amount independent of any other promoter material.

Also disclosed are heterogeneous catalysts comprising: ruthenium in an amount from about 1 wt % to about 20 wt % based on the total weight of the heterogeneous catalyst; a promoter material in an amount of about 0.1 wt % to about 5 wt % based on the total weight of the heterogeneous catalyst; and a metal oxide support; wherein the promoter material comprises a Group I compound, a Group II compound, a lanthanide compound, or combinations thereof; and wherein when a combination of promoter materials is present, each is present in an amount independent of any other promoter material.

Also disclosed are processes for synthesizing a disclosed heterogeneous catalyst, the process comprising: forming a metal compound solution comprising a solvent and a metal compound; forming a mixture of the metal compound solution and a metal oxide; wherein the metal compound is present in amount corresponding to about 0.05 wt % to about 20 wt % based on the total weight of the metal oxide powder and the metal compound; wherein the metal compound is an organometallic compound or a metal salt comprising a metal selected from Group 7, Group 8, Group 9, Group 10, Group 11, or combinations thereof; wherein the metal oxide is present in an amount of about 60 wt % to about 99 wt % based on the total weight of the metal oxide and the metal compound; and, reacting the mixture at a temperature of about 5° C. to about 95° C. for a period of time from about 1 minute to about 72 hours; thereby forming the heterogeneous catalyst.

Also disclosed are processes for synthesizing a disclosed heterogeneous catalyst, the process comprising: forming a ruthenium compound solution comprising a ruthenium compound and a solvent; forming a mixture of the ruthenium compound solution and a metal oxide; wherein the ruthenium compound is present in amount corresponding to about 0.05 wt % to about 20 wt % based on the total weight of the metal oxide powder and the ruthenium; wherein the ruthenium compound is an organometallic compound or a metal cation derived from a metal salt; wherein the metal oxide is present in an amount of about 60 wt % to about 99 wt % based on the total weight of the metal oxide and the ruthenium compound; and, reacting the mixture at a temperature of about 5° C. to about 95° C. for a period of time from about 1 minute to about 72 hours; thereby forming the heterogeneous catalyst.

Also disclosed are processes for the synthesis of ammonia, comprising: conveying a flow of a reactant gas mixture into the reaction chamber via an entry port; wherein the reaction chamber is at a pressure of about 2 torr to about 20 atm; and wherein the reaction chamber comprises a disclosed heterogeneous catalyst; contacting the reactant gas mixture and the heterogeneous catalyst; heating the heterogeneous catalyst using microwave energy; reacting the reactant gas mixture in contact with the heterogeous catalyst, thereby providing a product gas mixture; and wherein the heterogeneous catalyst reaction has a heterogeneous catalyst reaction temperature of from about 50° C. to about 1000° C.; wherein the reactant gas mixture comprises nitrogen and hydrogen; wherein the product gas mixture comprises ammonia; conveying the product gas mixture from the reaction chamber via an exit port.

Also disclosed are processes for the synthesis of ammonia, comprising: providing a reaction chamber with a disclosed heterogeneous catalyst, or a heterogeneous catalyst made by a disclosed process; conveying a flow of a reactant gas mixture into the reaction chamber via an entry port; contacting the reactant gas mixture and the heterogeneous catalyst; heating the heterogeneous catalyst using microwave energy, thereby providing a product gas mixture; and conveying the product gas mixture from the reaction chamber via an exit port; wherein the reaction chamber has a pressure of about 2 torr to about 20 atm; wherein the reactant gas mixture comprises nitrogen and hydrogen; and wherein the product gas mixture comprises ammonia.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described aspects are usable in all aspects of the disclosure taught herein. Furthermore, the individual features of the dependent claims, as well as all optional and preferred features and modifications of the described aspects are combinable and interchangeable with one another.

BRIEF DESCRIPTION OF THE FIGURES

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 shows the effect of microwave frequency on the $NH_3$ yield using a disclosed catalyst (4 wt % $Ru/Al_2O_3$) at reaction temperature of 280° C. and GHSV=5000 $h^{-1}$ at the indicated microwave frequencies.

FIG. 4A shows representative data for the total amount of ammonia produced in 30 min by various disclosed heterogeneous catalyst compositions at 300° C. compared to a conventional Fe catalyst used in the conventional H-B process. FIG. 4B shows representative data for the yield of ammonia using the indicated disclosed catalysts with and without promoter materials.

FIGS. 9A-9D show representative data for durability testing of a representative disclosed catalyst (10 wt % Ru/MgO) in a reaction carried out at 320° C. over a 24 hour period and microwave energy of 300 W. FIG. 9A shows representative data for the yield of ammonia versus time of reaction on Day 1. FIG. 9B show representative data for the temperature versus time of reaction on Day 1, corresponding to the times shown in FIG. 9A. FIG. 9C shows representative data for the yield of ammonia versus time of reaction on Day 2. FIG. 9D show representative data for the temperature versus time of reaction on Day 1, corresponding to the times showing in FIG. 9C.

sample collection time 1 h, interruption time 2 h; Cycle 4: sample collection time 1 h, interruption time 26 h; Cycle 5: sample collection time 1.

Figure 11A:
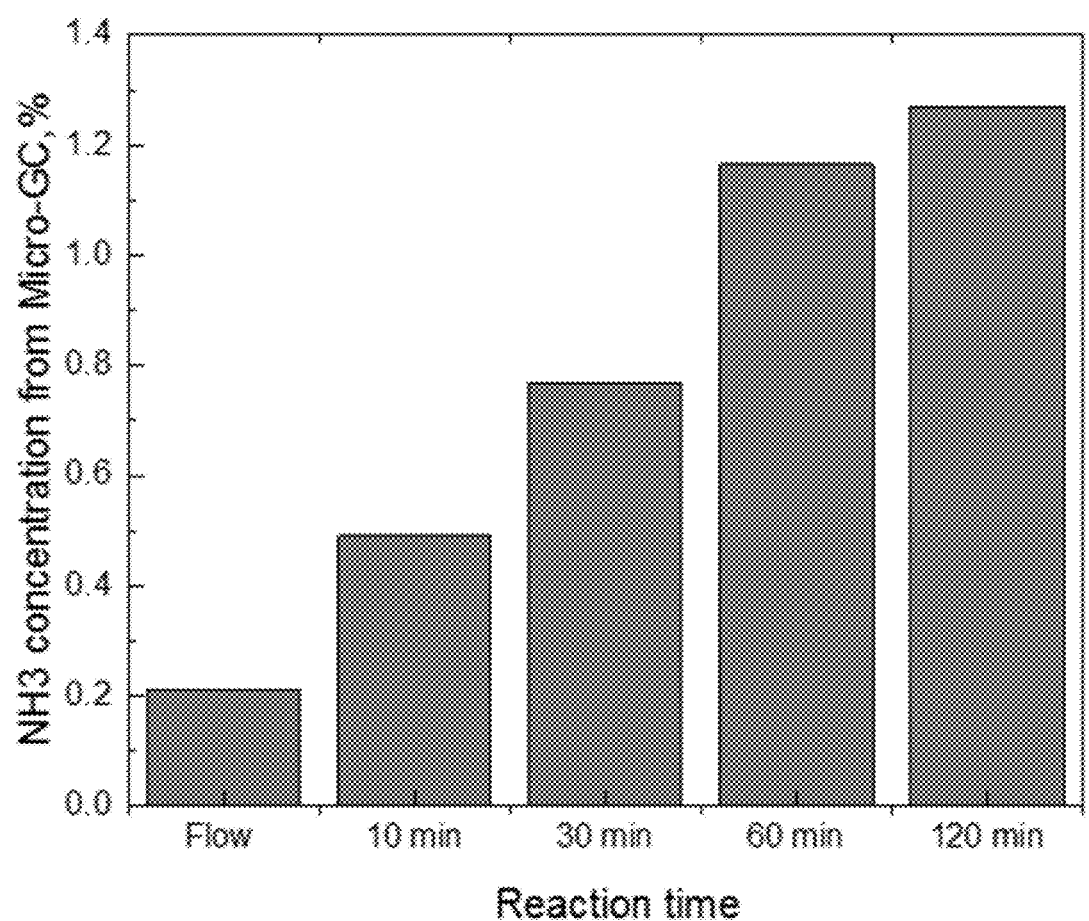
Figure 11B:
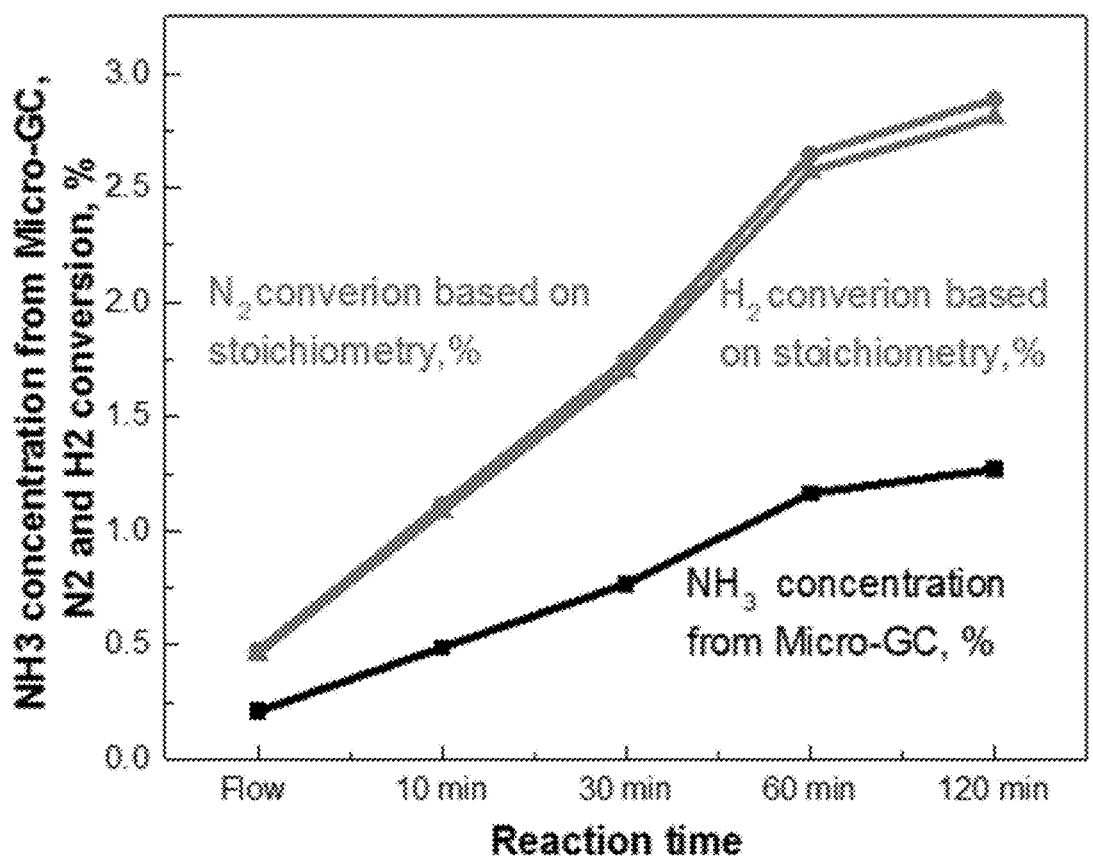

FIGS. 11A-11B show representative data for the effect of reaction time on $NH_3$ concentration when a disclosed process for synthesis of ammonia was carried out in a batch mode reaction. Briefly, $H_2$ and hydrogen conversion were calculated based on stoichiometry. The reaction was carried out at a reaction temperature of 280° C. and ambient pressure.

Figure 12:
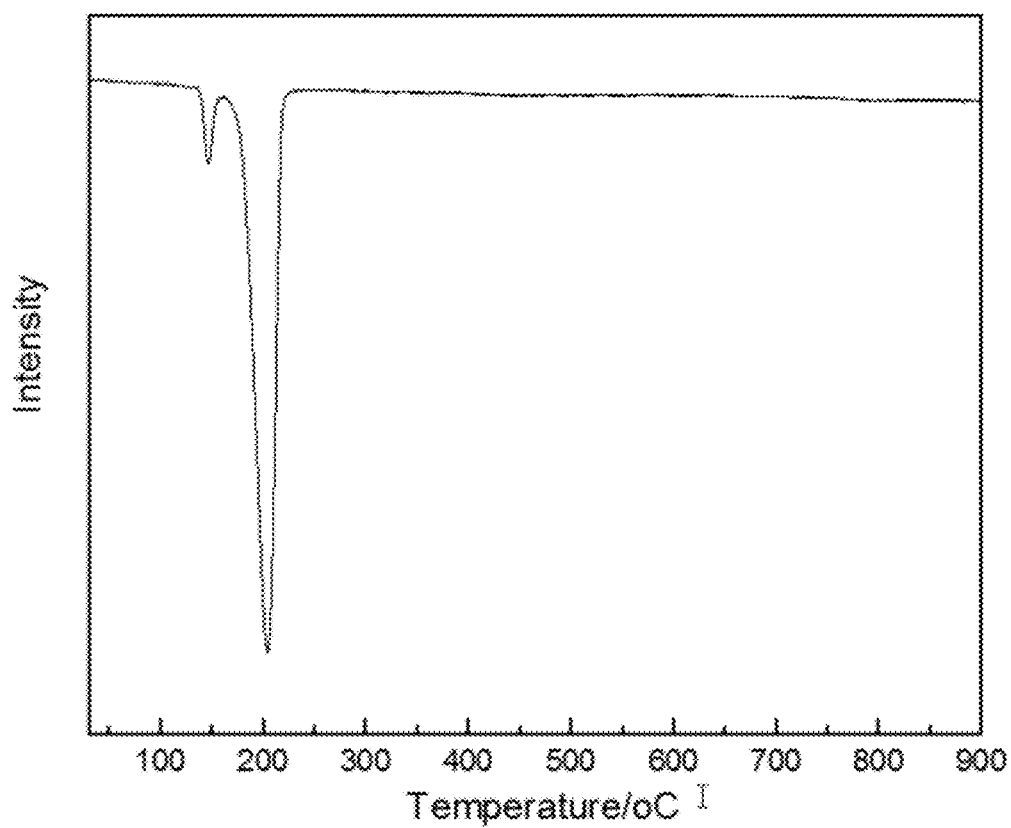

FIG. 12 shows representative data for temperature programmed reduction with $H_2$ ($H_2$-TPR) of an oxidized disclosed catalyst (4 wt % Ru/γ-$Al_2O_3$).

Figure 13:
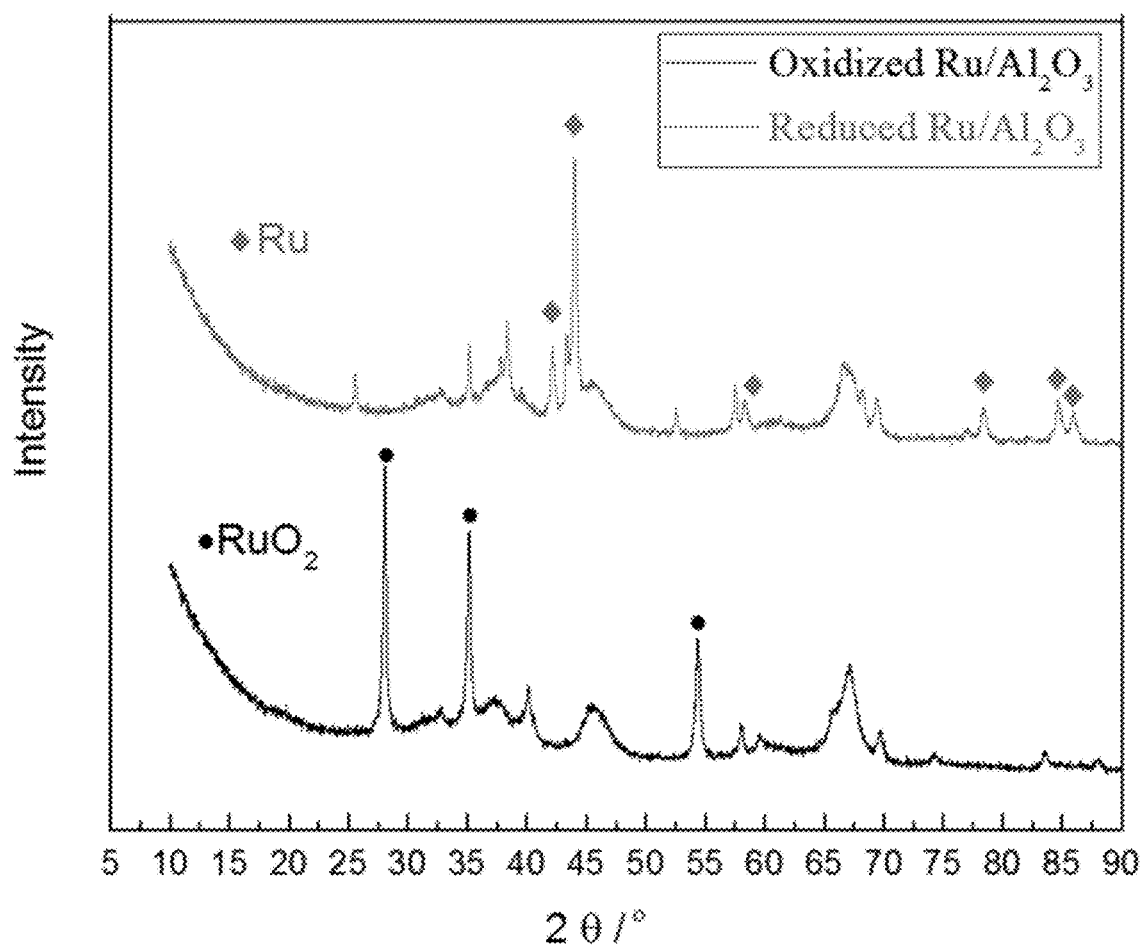

FIG. 13 shows representative x-ray diffraction (XRD) patterns of oxidized and reduced disclosed catalyst (4 wt % Ru/γ-$Al_2O_3$).

Figure 14:
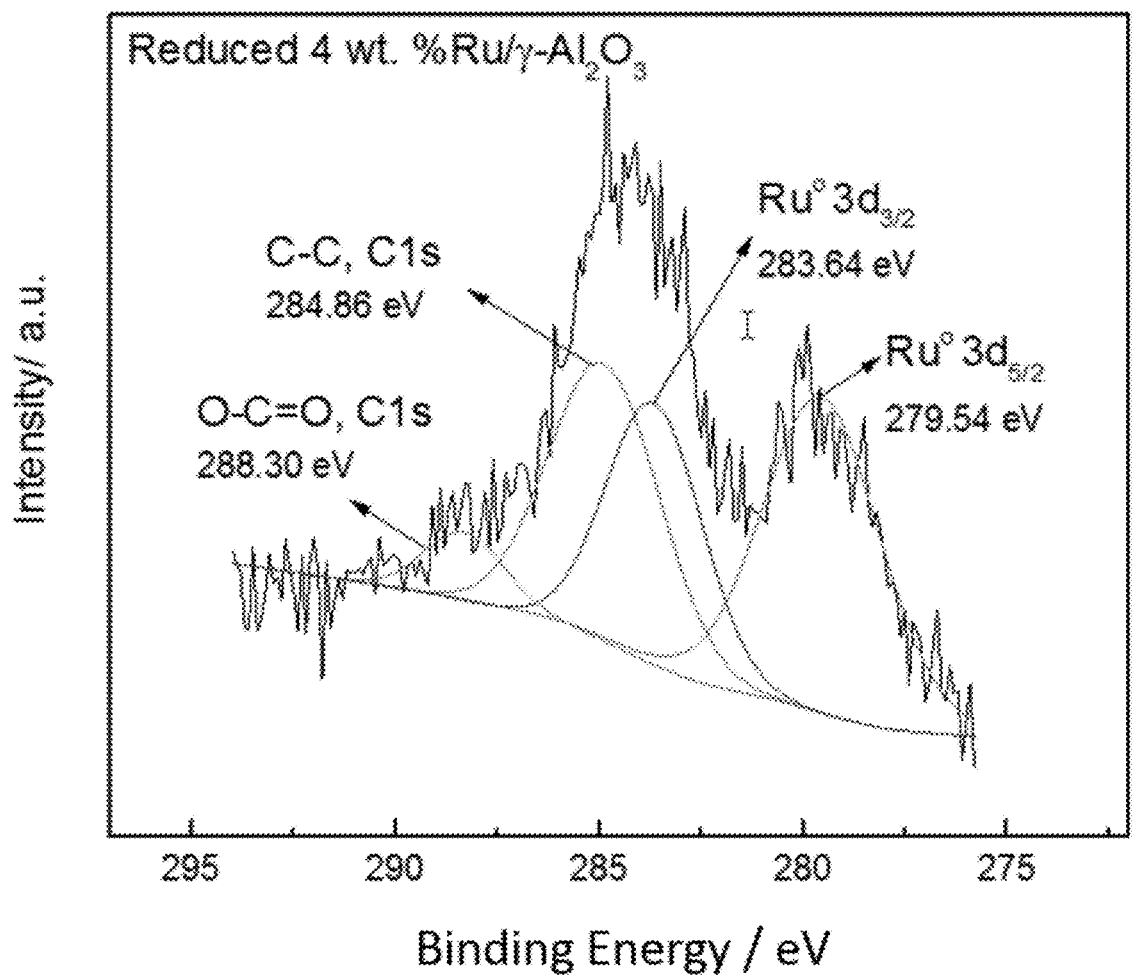

FIG. 14 shows representative X-ray photoelectron spectroscopy (XPS) data for Ru3d in a reduced disclosed catalyst (4 wt % Ru/γ-$Al_2O_3$).

Figure 15A:
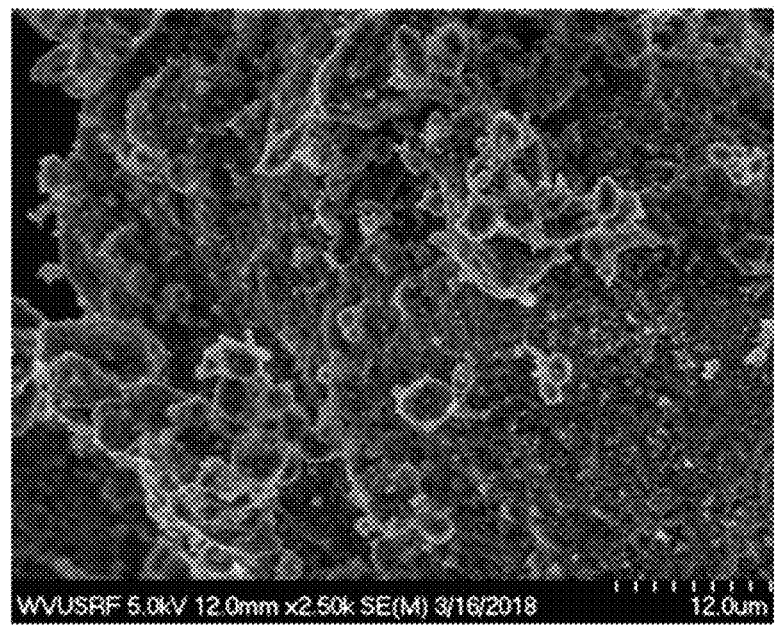
Figure 15B:
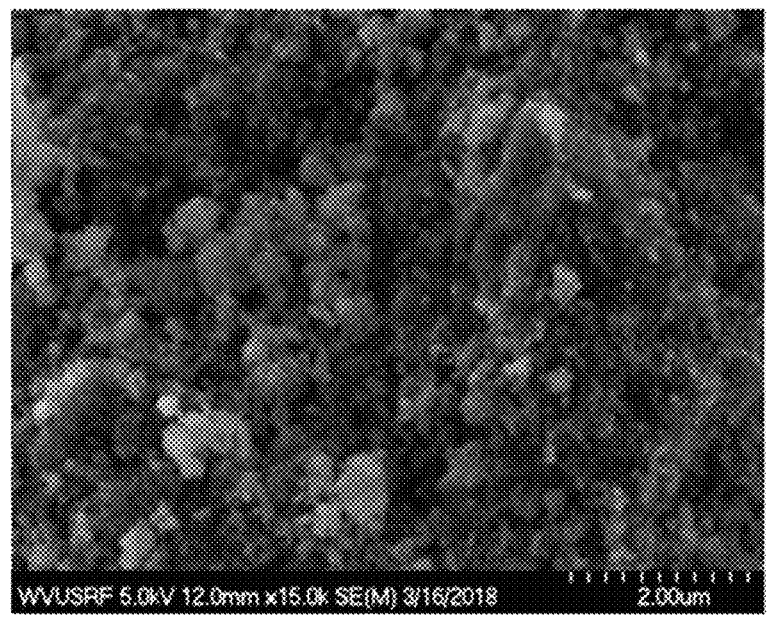

FIGS. 15A-15B show representative scanning electron micrograph (SEM) images of a reduced disclosed catalyst (4 wt % Ru/γ-$Al_2O_3$). FIG. 15A shows an SEM image at lower magnification (with the scalar bar shown in the lower right hand side). FIG. 15B shows an SEM image at a higher magnification (with the scalar bar shown in the lower right hand side).

Figure 16A:
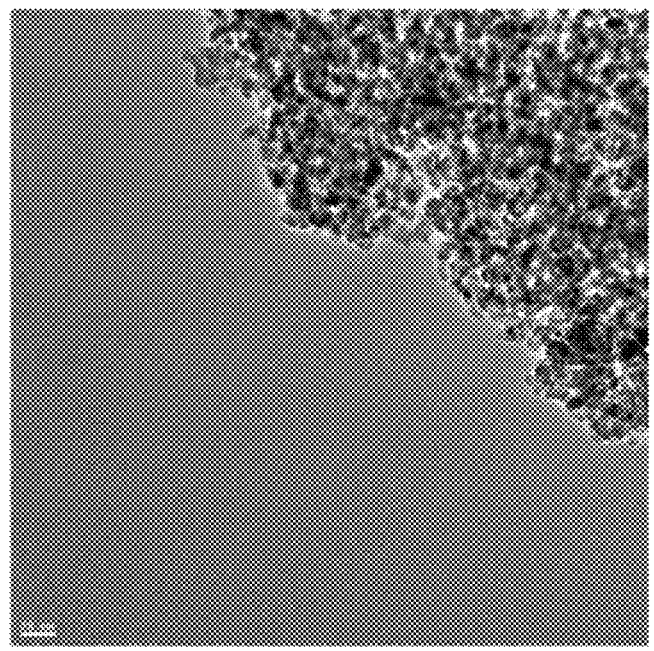
Figure 16B:
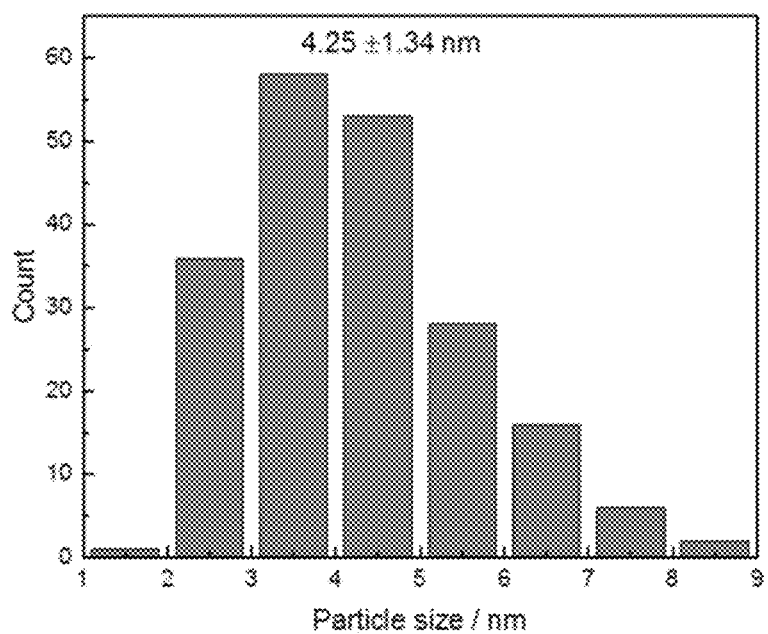

FIGS. 16A-16B show representative pertaining to particle size of a reduced disclosed catalyst (4 wt % Ru/γ-$Al_2O_3$). FIG. 16A shows a representative transmission electron micrograph (TEM) image of a reduced disclosed catalyst (4 wt % Ru/γ-$Al_2O_3$). FIG. 16B shows representative metal particle size data obtained from image data such as that shown in FIG. 16A.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

Many modifications and other aspects disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual aspects described and illustrated herein has discrete components and features which may be readily separated from or combined with the features of any of the other several aspects without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

A. DEFINITIONS

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a metal oxide," "an inert gas," or "a catalyst," includes, but is not limited to, two or more such metal oxides, inert gases, or catalysts, and the like.

Moreover, reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" heterogeneous catalyst is interpreted to include one or more heterogeneous catalyst molecules that may or may not be identical (e.g., different compositions of a heterogeneous catalyst within the scope of the present disclosure).

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a catalyst refers to an amount that is sufficient to achieve the desired improvement in the property modulated by the formulation component, e.g. achieving the desired level of modulus. Thus, for example, the specific level in terms of wt % of specific components in a heterogeneous catalyst composition required as an effective amount will depend upon a variety of factors including the amount and type of catalyst; composition of reactant gas mixture; amount, frequency and wattage of microwave energy that will be used during product; and production requirements in the use of the heterogeneous catalyst in preparing ammonia by the disclosed methods.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt %," and "wt %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

As used herein the terms "volume percent," "vol %," and "vol. %," which can be used interchangeably, indicate the percent by volume of a given gas based on the total volume at a given temperature and pressure, unless otherwise specified. That is, unless otherwise specified, all vol % values are based on the total volume of the composition. It should be understood that the sum of vol % values for all components in a disclosed composition or formulation are equal to 100.

Compounds are described using standard nomenclature. Unless defined otherwise, technical and scientific terms used herein have the same meaning as is commonly understood by one of skill in the art to which this disclosure belongs. For example, reference to Group 1, Group 2, and other atoms are in reference to IUPAC nomenclature as it applies to the periodic table. In particular, the group nomenclature used herein is that this is in accordance with that put forth in the IUPAC proposal was first circulated in 1985 for public comments (Pure Appl. Chem. IUPAC. 60 (3): 431-436. doi:10.1351/pac198860030431), and was later included as part of the 1990 edition of the Nomenclature of Inorganic Chemistry (Nomenclature of Inorganic Chemistry: Recommendations 1990. Blackwell Science, 1990. ISBN 0-632-02494-1).

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

B. CATALYST COMPOSITIONS

In one aspect, the disclosure relates to heterogeneous catalysts comprising ruthenium metal and a metal oxide. More specifically, in one aspect, the present disclosure relates to heterogeneous catalysts comprising: a metal selected from Group 7, Group 8, Group 9, Group 10, Group 11, or combinations thereof; wherein the metal is present in an amount from about 1 wt % to about 50 wt % based on the total weight of the heterogeneous catalyst; and a metal oxide support.

In a further aspect, disclosed are heterogeneous catalysts comprising: a metal selected from Group 7, Group 8, Group 9, Group 10, Group 11, or combinations thereof; wherein the metal is present in an amount from about 1 wt % to about 20 wt % based on the total weight of the heterogeneous catalyst; and a metal oxide support.

In a further aspect, disclosed are heterogeneous catalysts comprising: a metal selected from Group 7, Group 8, Group 9, Group 10, Group 11, or combinations thereof; wherein the metal is present in an amount from about 1 wt % to about 10 wt % based on the total weight of the heterogeneous catalyst; and a metal oxide support.

In various aspects, disclosed are heterogeneous catalysts comprising: ruthenium in an amount from about 1 wt % to about 50 wt % based on the total weight of the heterogeneous catalyst; and a metal oxide support.

In various aspects, disclosed are heterogeneous catalysts comprising: ruthenium in an amount from about 1 wt % to about 20 wt % based on the total weight of the heterogeneous catalyst; and a metal oxide support.

In a further aspect, disclosed are heterogeneous catalysts comprising: ruthenium in an amount from about 1 wt % to about 10 wt % based on the total weight of the heterogeneous catalyst; and a metal oxide support.

In various aspects, disclosed are heterogeneous catalysts comprising: a metal selected from Group 7, Group 8, Group 9, Group 10, Group 11, or combinations thereof; wherein the metal is present in an amount from about 1 wt % to about 50 wt % based on the total weight of the heterogeneous catalyst; a promoter material in an amount of about 0.1 wt % to about 5 wt % based on the total weight of the heterogeneous catalyst; and a metal oxide support; wherein the promoter material comprises a Group I compound, a Group II compound, a lanthanide compound, or combinations thereof; and wherein when a combination of promoter materials is present, each is present in an amount independent of any other promoter material.

In various aspects, disclosed are heterogeneous catalysts comprising: a metal selected from Group 7, Group 8, Group 9, Group 10, Group 11, or combinations thereof; wherein the metal is present in an amount from about 1 wt % to about 20 wt % based on the total weight of the heterogeneous catalyst; a promoter material in an amount of about 0.1 wt % to about 5 wt % based on the total weight of the heterogeneous catalyst; and a metal oxide support; wherein the promoter material comprises a Group I compound, a Group II compound, a lanthanide compound, or combinations thereof; and wherein when a combination of promoter materials is present, each is present in an amount independent of any other promoter material.

In various aspects, disclosed are heterogeneous catalysts comprising: a metal selected from Group 7, Group 8, Group 9, Group 10, Group 11, or combinations thereof; wherein the metal is present in an amount from about 1 wt % to about 10 wt % based on the total weight of the heterogeneous catalyst; a promoter material in an amount of about 0.1 wt % to about 5 wt % based on the total weight of the heterogeneous catalyst; and a metal oxide support; wherein the promoter material comprises a Group I compound, a Group II compound, a lanthanide compound, or combinations thereof; and wherein when a combination of promoter materials is present, each is present in an amount independent of any other promoter material.

In a further aspect, disclosed are heterogeneous catalysts comprising: ruthenium in an amount from about 1 wt % to about 50 wt % based on the total weight of the heterogeneous catalyst; a promoter material in an amount of about 0.1 wt % to about 5 wt % based on the total weight of the heterogeneous catalyst; and a metal oxide support; wherein the promoter material comprises a Group I compound, a Group II compound, a lanthanide compound, or combinations thereof; and wherein when a combination of promoter materials is present, each is present in an amount independent of any other promoter material.

In a further aspect, disclosed are heterogeneous catalysts comprising: ruthenium in an amount from about 1 wt % to about 20 wt % based on the total weight of the heterogeneous catalyst; a promoter material in an amount of about 0.1 wt % to about 5 wt % based on the total weight of the heterogeneous catalyst; and a metal oxide support; wherein the promoter material comprises a Group I compound, a Group II compound, a lanthanide compound, or combinations thereof; and wherein when a combination of promoter materials is present, each is present in an amount independent of any other promoter material.

In various aspects, disclosed are heterogeneous catalysts comprising: ruthenium in an amount from about 1 wt % to about 10 wt % based on the total weight of the heterogeneous catalyst; optionally a promoter material in an amount of about 0.1 wt % to about 5 wt % based on the total weight of the heterogeneous catalyst; and a metal oxide support; wherein the promoter material comprises a Group I compound, a Group II compound, a lanthanide compound, or combinations thereof; and wherein when a combination of promoter materials is present, each is present in an amount independent of any other promoter material.

Further aspects of the disclosed heterogeous catalysts are provided in the "Aspects" section herein below.

C. PROCESSES FOR PREPARING THE CATALYST COMPOSITIONS

In accordance with the purpose of the disclosure, as embodied and broadly described herein, another aspect of the present disclosure relates to processes for making the disclosed catalyst compositions. In an aspect the process comprises preparing a mixture of ruthenium salt and the metal oxide.

In various aspects, disclosed are processes for synthesizing a disclosed heterogeneous catalyst, the process comprising: forming a metal compound solution comprising a solvent and a metal compound; forming a mixture of the metal compound solution and a metal oxide; wherein the metal compound is present in amount corresponding to about 0.05 wt % to about 50 wt % based on the total weight of the metal oxide powder and the metal compound; wherein the metal compound is an organometallic compound or a metal salt comprising a metal selected from Group 7, Group 8, Group 9, Group 10, Group 11, or combinations thereof; wherein the metal oxide is present in an amount of about 60 wt % to about 99 wt % based on the total weight of the metal oxide and the metal compound; and, reacting the mixture at a temperature of about 5° C. to about 95° C. for a period of time from about 1 minute to about 72 hours; thereby forming the heterogeneous catalyst.

In a further aspect, disclosed are processes for synthesizing a disclosed heterogeneous catalyst, the process comprising: forming a metal compound solution comprising a solvent and a metal compound; forming a mixture of the metal compound solution and a metal oxide; wherein the metal compound is present in amount corresponding to about 0.05 wt % to about 20 wt % based on the total weight of the metal oxide powder and the metal compound; wherein the metal compound is an organometallic compound or a metal salt comprising a metal selected from Group 7, Group 8, Group 9, Group 10, Group 11, or combinations thereof; wherein the metal oxide is present in an amount of about 60 wt % to about 99 wt % based on the total weight of the metal oxide and the metal compound; and, reacting the mixture at a temperature of about 5° C. to about 95° C. for a period of time from about 1 minute to about 72 hours; thereby forming the heterogeneous catalyst.

In a further aspect, disclosed are processes for synthesizing a disclosed heterogeneous catalyst, the process comprising: forming a metal compound solution comprising a solvent and a metal compound; forming a mixture of the metal compound solution and a metal oxide; wherein the metal compound is present in amount corresponding to about 0.05 wt % to about 10 wt % based on the total weight of the metal oxide powder and the metal compound; wherein the metal compound is an organometallic compound or a metal salt comprising a metal selected from Group 7, Group 8, Group 9, Group 10, Group 11, or combinations thereof; wherein the metal oxide is present in an amount of about 60 wt % to about 99 wt % based on the total weight of the metal oxide and the metal compound; and, reacting the mixture at a temperature of about 5° C. to about 95° C. for a period of time from about 1 minute to about 72 hours; thereby forming the heterogeneous catalyst.

In various aspects, disclosed processes for synthesizing a disclosed heterogeneous catalyst, the process comprising: forming a ruthenium compound solution comprising a ruthenium compound and a solvent; forming a mixture of the ruthenium compound solution and a metal oxide; wherein the ruthenium compound is present in amount corresponding to about 0.05 wt % to about 50 wt % based on the total weight of the metal oxide powder and the ruthenium; wherein the ruthenium compound is an organometallic compound or a metal cation derived from a metal salt; wherein the metal oxide is present in an amount of about 60 wt % to about 99 wt % based on the total weight of the metal oxide and the ruthenium compound; and, reacting the mixture at a temperature of about 5° C. to about 95° C. for a period of time from about 1 minute to about 72 hours; thereby forming the heterogeneous catalyst.

In various aspects, disclosed processes for synthesizing a disclosed heterogeneous catalyst, the process comprising: forming a ruthenium compound solution comprising a ruthenium compound and a solvent; forming a mixture of the ruthenium compound solution and a metal oxide; wherein the ruthenium compound is present in amount corresponding to about 0.05 wt % to about 20 wt % based on the total weight of the metal oxide powder and the ruthenium; wherein the ruthenium compound is an organometallic compound or a metal cation derived from a metal salt; wherein the metal oxide is present in an amount of about 60 wt % to about 99 wt % based on the total weight of the metal oxide and the ruthenium compound; and, reacting the mixture at a temperature of about 5° C. to about 95° C. for a period of time from about 1 minute to about 72 hours; thereby forming the heterogeneous catalyst.

In various aspects, disclosed are processes for synthesizing a disclosed heterogeneous catalyst, the process comprising: forming a ruthenium compound solution comprising a ruthenium compound and a solvent; forming a mixture of the ruthenium compound solution and a metal oxide; wherein the ruthenium compound is present in amount corresponding to about 0.05 wt % to about 10 wt % based on the total weight of the metal oxide powder and the ruthenium; wherein the ruthenium compound is an organometallic compound or a metal cation derived from a metal salt; wherein the metal oxide is present in an amount of about 60 wt % to about 99 wt % based on the total weight of the metal oxide and the ruthenium compound; and, reacting the mixture at a temperature of about 5° C. to about 95° C. for a period of time from about 1 minute to about 72 hours; thereby forming the heterogeneous catalyst.

In various aspects, the disclosed catalysts can be prepared by an incipient wetness impregnation method.

In various aspects, the disclosed catalysts can be prepared by using spray application methods comprising spraying a solution of the ruthenium salt onto a metal oxide support.

In various aspects, the disclosed catalysts can be prepared using chemical vapor deposition methods.

In various aspects, the disclosed catalysts can be prepared using a metal nano particle material, wherein a ruthenium metal nanoparticle material is prepared using sol-gel techniques, followed by adhering the ruthenium metal containing sol-gel onto the metal oxide support, then calcining the material to fix the ruthenium metal onto the metal oxide support.

In various aspects, drying is understood to include a state wherein the catalyst is essentially dry, but nevertheless comprises some amount of solvent, such as water. That is the material can be dry, but have solvent molecules present in the pore structure of the catalyst such that there are hydroxyl (OH) groups and protons present on a surface of the catalyst.

In various aspects, the catalyst can be used in the disclosed methods for conversion of nitrogen and hydrogen into ammonia after the calcining step of the disclosed methods for the preparation of the catalyst. Optionally, after the calcining step, the catalyst can be further processed by a pre-reduction step wherein the catalyst is exposed to a flow of gas comprising hydrogen. The pre-reduction step can further comprise heating the catalyst in the presence of the gas flow.

Further aspects of the disclosed processes for preparing the heterogeneous catalysts are provided in the "Aspects" section herein below.

D. PROCESSES FOR SYNTHESIS OF AMMONIA

In accordance with the purpose of the disclosure, as embodied and broadly described herein, another aspect of the present disclosure relates to processes for the synthesis of ammonia, comprising: conveying a flow of a reactant gas mixture into the reaction chamber via an entry port; wherein the reaction chamber is at a pressure of about 2 torr to about 20 atm; and wherein the reaction chamber comprises a disclosed heterogeneous catalyst; contacting the reactant gas mixture and the heterogeneous catalyst; heating the heterogeneous catalyst using microwave energy; reacting the reactant gas mixture in contact with the heterogeous catalyst, thereby providing a product gas mixture; and wherein the heterogeneous catalyst reaction has a heterogeneous catalyst reaction temperature temperature of from about 50° C. to about 1000° C.; wherein the reactant gas mixture comprises nitrogen and hydrogen; wherein the product gas mixture comprises ammonia; conveying the product gas mixture from the reaction chamber via an exit port.

In various aspects, a disclosed process for ammonia synthesis comprises: providing a reaction chamber with a disclosed heterogeneous catalyst, or a heterogeneous catalyst made by a disclosed process; conveying a flow of a reactant gas mixture into the reaction chamber via an entry port; contacting the reactant gas mixture and the heterogeneous catalyst; heating the heterogeneous catalyst using microwave energy, thereby providing a product gas mixture; and conveying the product gas mixture from the reaction chamber via an exit port; wherein the reaction chamber has a pressure of about 2 torr to about 20 atm; wherein the reactant gas mixture comprises nitrogen and hydrogen; and wherein the product gas mixture comprises ammonia.

Figure 2:
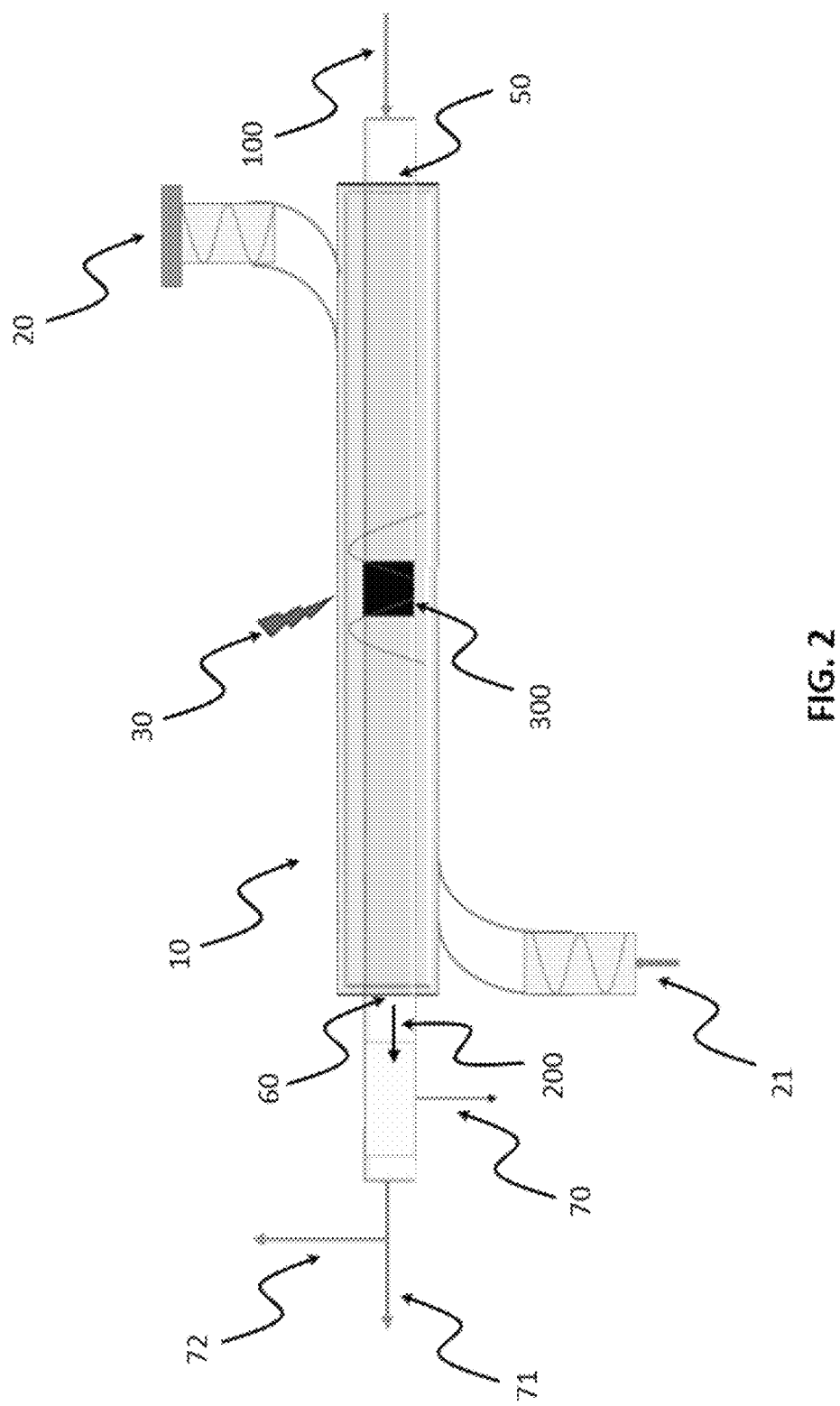
FIG. 2 shows a representative apparatus for carrying out a disclosed process for ammonia synthesis.

Referring now to FIG. 2, a disclosed fixed bed reaction chamber is showing in a cross-sectional view. Briefly, the fixed bed reaction chamber comprises: a catalyst 300 in a fixed bed within a quartz tube 10; a reactant gas mixture feed 100 conveyed through an entry port 50; a spark generator 30; a microwave input 21 and a sliding short circuit (or alternatively referred to herein as a "sliding short") 20, wherein the sliding short circuit can be used to adjust the location of the electric field maximum in the reaction chamber; an exit port 60 through which is conveyed a product gas mixture 200; into a directing chamber which can be configured to direct streams of the product gas mixture to various optional destinations, e.g., a moisture removal apparatus 70 to collect product gas with water removed; analytical instrumentation, e.g., GC chromatography, 71 or mass spectrometry 72.

Further aspects of the disclosed processes for synthesis of ammonia using microwave energy and the disclosed heterogeneous catalysts are provided in the "Aspects" section herein below.

In various aspects, the disclosed process utilizes variable microwave energy and a catalyst to efficiently synthesize ammonia from a reactant gas mixture comprising hydrogen and nitrogen.

In a conventional Haber-Bosch (H-B) process, the synthesis of ammonia can be represented as follows:

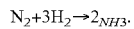

The reaction is exothermic, and the equilibrium lies to the right at low temperature. However, the rate of ammonia generation is slow. Catalysts can be used to speed up the rate of reaction. However, high temperatures are required for a catalyst to work, and due to the negative entropy of the reaction, the higher temperatures result in a shift of the product back to the reactants. Pressure is commonly increased to drive equilibrium to the right. The resulting process is commonly carried out at temperatures ranging from 380 to 570° C. and pressures ranging from 150 to 250 atmospheres.

In a conventional H-B process, the rate determining step is primarily the dissociation of the $N_2$ on the catalyst surface:
$N_2 \rightarrow 2N^*$ ($N_2$ activation, rate determining step, high activation energy, 500° C., 2500 psig).

In comparison, in various aspects of the present disclosure microwave irradiation is employed to activate reactant molecules and "active sites" on the catalyst to form intermediates that undergo reaction pathways of lower activation energy. Therefore, the energy intensive high-pressure reaction/high temperature required for conventional H-B process can be avoided.

Figure 1:
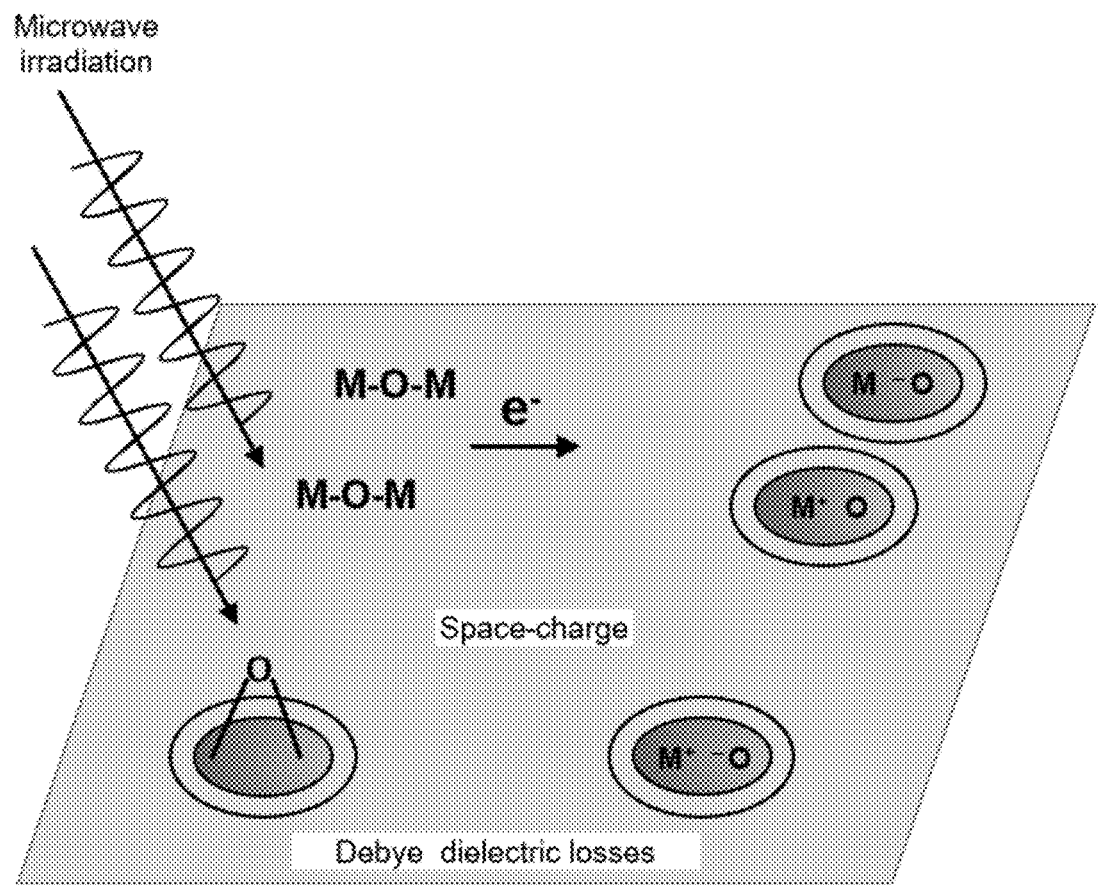
FIG. 1 shows a representative schematic illustration of possible mechanisms for the interaction of microwaves with the surface of a disclosed catalyst. Briefly, the figure schematically shows space-charge and Debye dielectric loss mechanisms for microwaves interacting with a catalyst surface for selective bond activation of reactant molecules.

In various aspects, under low temperature and ambient pressure, the disclosed processes synergistically integrate microwave (including microwave induced plasma) reaction chemistry with heterogeneous catalysts that selectively activate nitrogen gas through microwave irradiation. Without being bound by any particular theory, one of the possible mechanisms by which the catalyst and reacting species can interact with the microwave field and provide energy to the reaction is by relaxation processes, such as dipolar or Debye processes, which involve the coupling of the radiation with dipoles in the solid catalyst. As schematically shown in FIG. 1, these dipoles can be defect sites (i.e. atomic vacancies) in the catalysts or dangling bonds on the surface of catalysts. From the standpoint of catalysis, dipoles on the surface can be reactant or products that would be susceptible to selective bond activation effects, which in turn can affect reaction rates.

In various aspects, the disclosed process can utilize variable frequency microwave energy to activate reactant and active sites on the surface of catalyst. provide. According to the various aspects, by using microwave catalytic technology, it is believed that the disclosed process for catalytic ammonia synthesis undergoes a new reaction pathway where the barrier for the initial dissociation of the dinitrogen is decoupled from the bonding energy of the intermediates.

Microwave catalytic process include a specific scenario where microwave can induce plasma. This specific scenario is relevant to microwave-assisted plasma reaction chemistry. In some instances, a microwave plasma can be formed, plasma-activated nitrogen and hydrogen will generate nitrogen ions $N_2^{+*}$ and free radicals such as $NH_x^*$, $N^*$, $H^*$ which react over the catalyst surface to form ammonia under low reaction severity. The overall the concept of microwave catalytic activation in the context of the disclosed processes is schematically shown in FIG. 2. Thus, the initial dissociation of the dinitrogen is decoupled from the bonding energy of the intermediates:

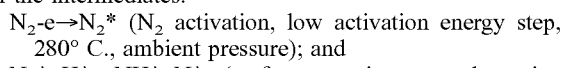

The disclosed processes synergistically integrate microwave plasma reaction chemistry with novel heterogeneous catalysis to decouple dinitrogen molecular activation from catalytic surface reaction, shifting the rate-determining step from dinitrogen dissociation to hydrogenation of $N_2^*$. Without wishing to be bound by a particular theory, the disclosed processes are fundamentally different from H-B reaction, in that one or more of the following mechanism can apply: 1) the $N_2$ is activated into active ion or radicals instead of surface adsorbed species, which still follow a gas-solid thermodynamic; and 2) the activated ionic/radical species instantly react with disassociated H atom for catalytic rearrangements.

cessing. However, none of these alternative ammonia synthesis technologies has made a significant impact in the industry. As shown in Table 1 below, the disclosed processes are compared with the conventional H-B process and emerging technologies. The disclosed processes are believed to provide an improved carbon footprint, do not require the use of natural gas or high quality $N_2$, and can be scaled to operate efficiently at the 1-150 MW energy utilization scale.

TABLE 1

Technical Performance Comparison.

| Process | Reaction Parameters | kg $CO_2$/ton $NH_3$ | Key Requirements | Notes |
| --- | --- | --- | --- | --- |
| Disclosed process | ~1 atm, ≤350° C. | Low $CO_2$ due to energy efficiency. Near zero $CO_2$ if renewable electricity is used. | Water, low quality $N_2$ | Improved $NH_3$ ammonia yield under plasma catalysis and ambient pressure; good economy of scale at 1-150 MW. |
| Haber-Bosch Ammonia (conventional industry method) | 300 atm, 500° C. | 1,600 | Natural gas, high purity $N_2$, water | $CO_2$ footprint; ~1000 tpd minimum size for cost-effective economy of scale. |
| Electrochem. Ammonia | 1 atm, ambient temperature | 19,000 | Electricity, water (aqueous system), | <1% current efficiency; scale up is a major issue. |
| Enzymatic Ammonia | 1 atm, ambient temperature | Not determined | Enzymes, co-factors, aqueous system | Cost/stability of enzymes; low productivity; and scale-up is a critical issue. |

Due to the operation under low reaction severity, anticipated energy savings of greater than 30% can be achieved over conventional H-B process. The ammonia synthesis technology described herein enables long-term energy storage and long-distance renewable energy delivery from remote, isolated, and/or stranded locations and creates an affordable refueling infrastructure of clean fuels.

Besides reduction in CAPEX and OPEX, it is believed that there are other practical benefits that could be realized, including: potential elimination (or near elimination) of natural gas requirements; scalable, less capital intensive processes; distributed scale application; employment of the processes where electricity is inexpensive (and available); and improved ease of operation relative to high pressure H-B processes (e.g., quick start-up/shutdown, system upsets).

With respect to the latter benefit, with conventional H-B processes the high pressure and temperature requirements necessitate steady state operation. However, in the paradigm of renewable energy conversion, utilizing intermittent excess energy, steady state operation would be challenging. Thus, on-demand ammonia synthesis enabled by a low pressure and temperature catalyzed microwave catalytic process would provide tremendous advantage.

For decades, the industry has been attempting to improve the H-B process by various approaches such as further optimization of catalysts, reaction conditions, and scalability. However, despite these continuous efforts, commercial ammonia synthesis remains largely based on the H-B process developed 100 years ago. Alternative technologies to the conventional H-B process have also received significant effort, including technologies such as electrochemical processing, enzymatic processing, and non-thermal plasma pro-

E. REFERENCES

References are cited herein throughout using the format of reference number(s) enclosed by parentheses corresponding to one or more of the following numbered references. For example, citation of references numbers ("Ref. No.") 1 and 2 immediately herein below would be indicated in the disclosure as (Refs. 1 and 2).

Ref No. 1: H. Liu, Chinese journal of catalysis, 35 (2014) 1619-1640.

Ref No. 2: B. Mindong, Z. Zhitao, B. Xiyao, B. Mindi, N. Wang, IEEE Transactions on Plasma Science, 31 (2003) 1285-1291.

Ref No. 3: B. Mingdong, B. Xiyao, Z. Zhitao, B. Mindi, Plasma Chemistry and Plasma Processing, 20 (2000) 511-520.

Ref No. 4: M. Bai, Z. Zhang, M. Bai, X. Bai, H. Gao, Plasma Chemistry and Plasma Processing, 28 (2008) 405-414.

Ref No. 5: A. Gómez-Ramirez, J. Cotrino, R. Lambert, A. González-Elipe, Plasma Sources Science and Technology, 24 (2015) 065011.

Ref No. 6: P. Peng, Y. Li, Y. Cheng, S. Deng, P. Chen, R. Ruan, Plasma Chemistry and Plasma Processing, 36 (2016) 1201-1210.

Ref No. 7: P. Peng, Y. Cheng, R. Hatzenbeller, M. Addy, N. Zhou, C. Schiappacasse, D. Chen, Y. Zhang, E. Anderson, Y. Liu, International Journal of Hydrogen Energy, 42 (2017) 19056-19066.

Ref No. 8: H. Uyama, O. Matsumoto, Plasma chemistry and plasma processing, 9 (1989) 13-24.

Ref No. 9: J. Nakajima, H. Sekiguchi, Thin Solid Films, 516 (2008) 4446-4451.

Ref No. 10: J. Menéndez, A. Dominguez, Y. Fernández, J. Pis, Energy & Fuels, 21 (2007) 373-378.

Ref No. 11: D. Bogdal, M. Lukasiewicz, J. Pielichowski, A. Miciak, S. Bednarz, Tetrahedron, 59 (2003) 649-653.

Ref No. 12: B. Desai, C. O. Kappe, Microwave-assisted synthesis involving immobilized catalysts, Immobilized Catalysts, Springer 2004, pp. 177-208.

Ref No. 13: D. Szabó, S. Schlabach, Inorganics, 2 (2014) 468.

Ref No. 14: F. Chemat, D. Esveld, M. Poux, J. Di-Martino, Journal of microwave power and electromagnetic energy, 33 (1998) 88-94.

Ref No. 15: S. Gopalakrishnan, J. Münch, R. Herrmann, W. Schwieger, Chemical Engineering Journal, 120 (2006) 99-105.

Ref No. 16: C. Elmasides, D. I. Kondarides, W. Grünert, X. E. Verykios, The Journal of Physical Chemistry B, 103 (1999) 5227-5239.

Ref No. 17: P. Betancourt, A. Rives, R. Hubaut, C. E. Scott, J. Goldwasser, Applied Catalysis A: General, 170 (1998) 307-314.

Ref No. 18: M. Wang, W. Weng, H. Zheng, X. Yi, C. Huang, H. Wan, Journal of Natural Gas Chemistry, 18 (2009) 300-305.

Ref No. 19: M. Nurunnabi, K. Murata, K. Okabe, M. Inaba, I. Takahara, Applied Catalysis A: General, 340 (2008) 203-211.

Ref No. 20: Y.-H. Huang, C.-C. Su, S.-L. Wang, M.-C. Lu, Energy, 46 (2012) 242-247.

Ref No. 21: A. Miyazaki, I. Balint, K.-i. Aika, Y. Nakano, Journal of Catalysis, 204 (2001) 364-371.

F. ASPECTS

The following listing of exemplary aspects supports and is supported by the disclosure provided herein.

Aspect 1. A heterogeneous catalyst comprising: a metal selected from Group 7, Group 8, Group 9, Group 10, Group 11, or combinations thereof; and a metal oxide support; wherein the metal is present in an amount from about 0.1 wt % to about 50 wt % based on the total weight of the heterogeneous catalyst.

Aspect 2. The heterogeneous catalyst of 1, wherein the metal is selected from ruthenium, rhodium, palladium, osmium, iridium, platinum, iron, cobalt, manganese, or combinations thereof.

Aspect 3. The heterogeneous catalyst of 1, wherein the metal is ruthenium.

Aspect 4. The heterogeneous catalyst of Aspect 3, wherein greater than about 50 wt % of the ruthenium in the heterogeneous catalyst is the form of reduced ruthenium.

Aspect 5. The heterogeneous catalyst of Aspect 4, wherein greater than about 70 wt % of the ruthenium in the heterogeneous catalyst is the form of reduced ruthenium.

Aspect 6. The heterogeneous catalyst of Aspect 5, wherein greater than about 90 wt % of the ruthenium in the heterogeneous catalyst is the form of reduced ruthenium.

Aspect 7. The heterogeneous catalyst of any one of Aspects 1-Aspect 6, wherein the metal in the heterogeneous catalyst is substantially all in the form of a fully reduced metal.

Aspect 8. The heterogeneous catalyst of any one of Aspects 1-Aspect 7, wherein the metal is present in an amount from about 1 wt % to about 50 wt %.

Aspect 9. The heterogeneous catalyst of Aspect 8, wherein the metal is present in an amount from about 1 wt % to about 40 wt %.

Aspect 10. The heterogeneous catalyst of Aspect 8, wherein the metal is present in an amount from about 1 wt % to about 30 wt %.

Aspect 11. The heterogeneous catalyst of Aspect 8, wherein the metal is present in an amount from about 1 wt % to about 25 wt %.

Aspect 12. The heterogeneous catalyst of Aspect 8, wherein the metal is present in an amount from about 1 wt % to about 20 wt %.

Aspect 13. The heterogeneous catalyst of Aspect 8, wherein the metal is present in an amount from about 1 wt % to about 15 wt %.

Aspect 14. The heterogeneous catalyst of Aspect 8, wherein the metal is present in an amount from about 0.5 wt % to about 10 wt %.

Aspect 15. The heterogeneous catalyst of Aspect 8, wherein the metal is present in an amount from about 0.5 wt % to about 7.5 wt %.

Aspect 16. The heterogeneous catalyst of Aspect 8, wherein the metal is present in an amount from about 0.5 wt % to about 5 wt %.

Aspect 17. The heterogeneous catalyst of Aspect 8, wherein the metal is present in an amount from about 1 wt % to about 10 wt %.

Aspect 18. The heterogeneous catalyst of Aspect 8, wherein the metal is present in an amount from about 1 wt % to about 7.5 wt %.

Aspect 19. The heterogeneous catalyst of Aspect 8, wherein the metal is present in an amount from about 1 wt % to about 5 wt %.

Aspect 20. The heterogeneous catalyst of Aspect 8, wherein the metal is present in an amount from about 2 wt % to about 5 wt %.

Aspect 21. The heterogeneous catalyst of Aspect 8, wherein the metal is present in an amount from about 3 wt % to about 5 wt %.

Aspect 22. The heterogeneous catalyst of Aspect 8, wherein the metal is present in an amount from about 3.5 wt % to about 4.5 wt %.

Aspect 23. The heterogeneous catalyst of any one of Aspects 1-Aspect 22, wherein the metal oxide support comprises an oxide of a metal selected from Group 4, Group 5, Group 6, Group 7, Group 8, Group 9, Group 10, Group 11, Group 12, Group 13, Group 14, and combination thereof.

Aspect 24. The heterogeneous catalyst of Aspect 23, wherein the metal oxide support comprises an oxide of a metal selected from scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, aluminum, gallium, tin, and combinations thereof.

Aspect 25. The heterogeneous catalyst of Aspect 23, MgO, $Al_2O_3$, $SiO_2$, $TiO_2$, $ZrO_2$, or combinations thereof.

Aspect 26. The heterogeneous catalyst of Aspect 23, wherein the metal oxide support comprises MgO, $Al_2O_3$, $SiO_2$, or combinations thereof.

Aspect 27. The heterogeneous catalyst of Aspect 23, wherein the metal oxide support comprises MgO, $Al_2O_3$, or combinations thereof.

Aspect 28. The heterogeneous catalyst of Aspect 23, wherein the metal oxide support comprises MgO.

Aspect 29. The heterogeneous catalyst of Aspect 23, wherein the metal oxide support comprises $Al_2O_3$.

Aspect 30. The heterogenous catalyst of any one of Aspects 1-Aspect 29, further comprising a promoter material in an amount of about 0.1 wt % to about 5 wt % based on the total weight of the heterogeneous catalyst; wherein the promoter material comprises a Group 1 compound, a Group 2 compound, a lanthanide compound, or combinations thereof; and wherein when a combination of promoter materials is present, each is present in an amount independent of any other promoter material.

Aspect 31. The heterogeneous catalyst of Aspect 30, wherein the promoter material is present in an amount of about 0.1 wt % to about 5 wt % based on the total weight of the heterogeneous catalyst; wherein the promoter material comprises an oxide of K, Ce, Ba, or combinations thereof.

Aspect 32. The heterogeneous catalyst of Aspect 30, wherein the promoter material is present in an amount of about 0.1 wt % to about 5 wt % based on the total weight of the heterogeneous catalyst; wherein the promoter material comprises an oxide of K.

Aspect 33. The heterogeneous catalyst of Aspect 30, wherein the promoter material is present in an amount of about 0.1 wt % to about 5 wt % based on the total weight of the heterogeneous catalyst; wherein the promoter material comprises an oxide of Ce.

Aspect 34. The heterogeneous catalyst of Aspect 30, wherein the promoter material is present in an amount of about 0.1 wt % to about 5 wt % based on the total weight of the heterogeneous catalyst; wherein the promoter material comprises an oxide of Ba.

Aspect 35. The heterogeneous catalyst of Aspect 30, wherein the promoter material comprises an oxide of K and an oxide of Ce; each promoter material is present independently in an amount of about 0.1 wt % to about 5 wt % based on the total weight of the heterogeneous catalyst.

Aspect 36. The heterogeneous catalyst of Aspect 30, wherein the promoter material comprises an oxide of K and an oxide of Ba; each promoter material is present independently in an amount of about 0.1 wt % to about 5 wt % based on the total weight of the heterogeneous catalyst.

Aspect 37. The heterogeneous catalyst of Aspect 30, wherein the promoter material comprises an oxide of Ba and an oxide of Ce; each promoter material is present independently in an amount of about 0.1 wt % to about 5 wt % based on the total weight of the heterogeneous catalyst.

Aspect 38. The heterogeneous catalyst of Aspect 30, wherein the promoter material comprises an oxide of K, an oxide of barium and an oxide of Ce; each promoter material is present independently in an amount of about 0.1 wt % to about 5 wt % based on the total weight of the heterogeneous catalyst.

Aspect 39. The heterogeneous catalyst of any one of Aspect 30-Aspect 38, wherein the promoter material is present in an amount of about 0.5 wt % to about 5 wt % based on the total weight of the heterogeneous catalyst.

Aspect 40. The heterogeneous catalyst of Aspect 39, wherein the promoter material is present in an amount of about 0.5 wt % to about 4 wt % based on the total weight of the heterogeneous catalyst.

Aspect 41. The heterogeneous catalyst of Aspect 39, wherein the promoter material is present in an amount of about 0.5 wt % to about 3 wt % based on the total weight of the heterogeneous catalyst.

Aspect 42. The heterogeneous catalyst of Aspect 39, wherein the promoter material is present in an amount of about 0.5 wt % to about 2.5 wt % based on the total weight of the heterogeneous catalyst.

Aspect 43. The heterogeneous catalyst of Aspect 39, wherein the promoter material is present in an amount of about 0.5 wt % to about 2 wt % based on the total weight of the heterogeneous catalyst.

Aspect 44. The heterogeneous catalyst of Aspect 39, wherein the promoter material is present in an amount of about 0.5 wt % to about 1.5 wt % based on the total weight of the heterogeneous catalyst.

Aspect 45. The heterogeneous catalyst of Aspect 39, wherein the promoter material is present in an amount of about 0.6 wt % to about 1.4 wt % based on the total weight of the heterogeneous catalyst.

Aspect 46. The heterogeneous catalyst of Aspect 39, wherein the promoter material is present in an amount of about 0.7 wt % to about 1.3 wt % based on the total weight of the heterogeneous catalyst.

Aspect 47. The heterogeneous catalyst of Aspect 39, wherein the promoter material is present in an amount of about 0.8 wt % to about 1.2 wt % based on the total weight of the heterogeneous catalyst.

Aspect 48. The heterogeneous catalyst of Aspect 39, wherein the promoter material is present in an amount of about 0.9 wt % to about 1.1 wt % based on the total weight of the heterogeneous catalyst.

Aspect 49. The heterogeneous catalyst of Aspect 39, wherein the promoter material is present in an amount of about 1 wt % based on the total weight of the heterogeneous catalyst.

Aspect 50. The heterogenous catalyst of any one of Aspects 1-Aspect 49, wherein the heterogeneous catalyst is in the form of particles, pellets, flakes, spheres, or combinations thereof.

Aspect 51. The heterogenous catalyst of Aspect 50, wherein the heterogeneous catalyst has an average metal particle size (d) of less than about 25 nm.

Aspect 52. The heterogeneous catalyst of Aspect 50, wherein the heterogeneous catalyst has an average metal particle size (d) of about 0.5 nm to about 20 nm.

Aspect 53. The heterogeneous catalyst of Aspect 50, wherein the heterogeneous catalyst has an average metal particle size (d) of about 0.5 nm to about 15 nm.

Aspect 54. The heterogeneous catalyst of Aspect 50, wherein the heterogeneous catalyst has an average metal particle size (d) of about 0.5 nm to about 10 nm.

Aspect 55. The heterogeneous catalyst of Aspect 50, wherein the heterogeneous catalyst has an average metal particle size (d) of about 0.5 nm to about 9 nm.

Aspect 56. The heterogeneous catalyst of Aspect 50, wherein the heterogeneous catalyst has an average metal particle size (d) of about 0.5 nm to about 8 nm.

Aspect 57. The heterogeneous catalyst of Aspect 50, wherein the heterogeneous catalyst has an average metal particle size (d) of about 0.5 nm to about 7 nm.

Aspect 58. The heterogeneous catalyst of Aspect 50, wherein the heterogeneous catalyst has an average metal particle size (d) of about 1 nm to about 7 nm.

Aspect 59. The heterogeneous catalyst of Aspect 50, wherein the heterogeneous catalyst has an average metal particle size (d) of about 1.5 nm to about 7 nm.

Aspect 60. The heterogeneous catalyst of Aspect 50, wherein the heterogeneous catalyst has an average metal particle size (d) of about 2 nm to about 7 nm.

Aspect 61. The heterogeneous catalyst of Aspect 50, wherein the heterogeneous catalyst has an average metal particle size (d) of about 2.5 nm to about 7 nm.

Aspect 62. The heterogeneous catalyst of Aspect 50, wherein the heterogeneous catalyst has an average metal particle size (d) of about 3 nm to about 7 nm.

Aspect 63. The heterogeneous catalyst of Aspect 50, wherein the heterogeneous catalyst has an average metal particle size (d) of about 3 nm to about 6 nm.

Aspect 64. The heterogeneous catalyst of Aspect 50, wherein the heterogeneous catalyst has an average metal particle size (d) of about 3 nm to about 5 nm.

Aspect 65. The heterogeneous catalyst of Aspect 50, wherein the heterogeneous catalyst has an average metal particle size (d) of about 3.5 nm to about 6.5 nm.

Aspect 66. The heterogeneous catalyst of Aspect 50, wherein the heterogeneous catalyst has an average metal particle size (d) of about 3.5 nm to about 6 nm.

Aspect 67. The heterogeneous catalyst of Aspect 50, wherein the heterogeneous catalyst has an average metal particle size (d) of about 3.5 nm to about 5.5 nm.

Aspect 68. The heterogeneous catalyst of Aspect 50, wherein the heterogeneous catalyst has an average metal particle size (d) of about 3.5 nm to about 5 nm.

Aspect 69. The heterogeneous catalyst of Aspect 50, wherein the heterogeneous catalyst has an average metal particle size (d) of about 3.5 nm to about 4.5 nm.

Aspect 70. The heterogeneous catalyst of Aspect 50, wherein the heterogeneous catalyst has an average metal particle size (d) of about 3.7 nm to about 4.7 nm.

Aspect 71. A process for synthesizing the heterogeneous catalyst of any one of the Aspects 1-Aspect 70, the process comprising: forming a metal compound solution comprising a metal compound and a solvent; forming a mixture of the ruthenium compound solution and a metal oxide; wherein the metal compound is present in amount corresponding to about 0.05 wt % to about 20 wt % based on the total weight of the metal oxide powder and the ruthenium; wherein the metal compound is an organometallic compound or a metal salt comprising a metal selected from Group 7, Group 8, Group 9, Group 10, Group 11, or combinations thereof; wherein the metal oxide is present in an amount of about 60 wt % to about 99 wt % based on the total weight of the metal oxide and the ruthenium compound; and, reacting the mixture at a temperature of about 5° C. to about 95° C. for a period of time from about 1 minute to about 72 hours; thereby forming the heterogeneous catalyst.

Aspect 72. The process of Aspect 71, wherein the metal compound is present in the metal compound solution in an amount of about 10 wt/vol % to about 30 wt/vol %.

Aspect 73. The process of Aspect 71, wherein the metal compound is present in the metal compound solution in an amount of about 10 wt/vol % to about 27 wt/vol %.

Aspect 74. The process of Aspect 71, wherein the metal compound is present in the metal compound solution in an amount of about 10 wt/vol % to about 25 wt/vol %.

Aspect 75. The process of Aspect 71, wherein the metal compound is present in the metal compound solution in an amount of about 10 wt/vol % to about 23 wt/vol %.

Aspect 76. The process of Aspect 71, wherein the metal compound is present in the metal compound solution in an amount of about 10 wt/vol % to about 20 wt/vol %.

Aspect 77. The process of Aspect 71, wherein the metal compound is present in the metal compound solution in an amount of about 15 wt/vol % to about 30 wt/vol %.

Aspect 78. The process of Aspect 71, wherein the metal compound is present in the metal compound solution in an amount of about 15 wt/vol % to about 27 wt/vol %.

Aspect 79. The process of Aspect 71, wherein the metal compound is present in the metal compound solution in an amount of about 15 wt/vol % to about 25 wt/vol %.

Aspect 80. The process of Aspect 71, wherein the metal compound is present in the metal compound solution in an amount of about 15 wt/vol % to about 23 wt/vol %.

Aspect 81. The process of Aspect 71, wherein the metal compound is present in the metal compound solution in an amount of about 15 wt/vol % to about 20 wt/vol %.

Aspect 82. The process of Aspect 71, wherein the metal compound is present in the metal compound solution in an amount of about 17 wt/vol % to about 30 wt/vol %.

Aspect 83. The process of Aspect 71, wherein the metal compound is present in the metal compound solution in an amount of about 17 wt/vol % to about 27 wt/vol %.

Aspect 84. The process of Aspect 71, wherein the metal compound is present in the metal compound solution in an amount of about 17 wt/vol % to about 25 wt/vol %.

Aspect 85. The process of Aspect 71, wherein the metal compound is present in the metal compound solution in an amount of about 17 wt/vol % to about 23 wt/vol %.

Aspect 86. The process of Aspect 71, wherein the metal compound is present in the metal compound solution in an amount of about 17 wt/vol % to about 22 wt/vol %.

Aspect 87. The process of Aspect 71, wherein the metal compound is present in the metal compound solution in an amount of about 17 wt/vol % to about 21 wt/vol %.

Aspect 88. The process of Aspect 71, wherein the metal compound is present in the metal compound solution in an amount of about 17 wt/vol % to about 20 wt/vol %.

Aspect 89. The process of any one of Aspect 71-Aspect 88, wherein the solvent is a protic solvent.

Aspect 90. The process of any one of Aspect 71-Aspect 88, wherein the solvent is water.

Aspect 91. The process of any one of Aspect 71-Aspect 90, wherein the metal compound is a metal salt comprising nitrate, nitrite, carbonate, sulfate, halide, or combinations thereof.

Aspect 92. The process of Aspect 91, wherein the metal compound is a metal salt comprising nitrate.

Aspect 93. The process of any one of Aspect 71-Aspect 91, wherein the metal compound is a ruthenium salt; and wherein the ruthenium salt comprises ruthenium (II), ruthenium (III), ruthenium (IV), or mixtures thereof.

Aspect 94. The process of Aspect 93, wherein the metal compound is a ruthenium salt comprising ruthenium (III).

Aspect 95. The process of any one of Aspect 71-Aspect 94, wherein the metal compound is ruthenium (III) nitrosylnitrate.

Aspect 96. The process of any one of Aspect 71-Aspect 95, wherein the metal compound solution is added to the metal oxide.

Aspect 97. The process of any one of Aspect 71-Aspect 95, wherein the reacting is carried out a temperature of about 10° C. to about 90° C.

Aspect 98. The process of Aspect 97, wherein the reacting is carried out a temperature of about 10° C. to about 80° C.

Aspect 99. The process of Aspect 97, wherein the reacting is carried out a temperature of about 10° C. to about 70° C.

Aspect 100. The process of Aspect 97, wherein the reacting is carried out a temperature of about 10° C. to about 60° C.

Aspect 101. The process of Aspect 97, wherein the reacting is carried out a temperature of about 10° C. to about 50° C.

Aspect 102. The process of Aspect 97, wherein the reacting is carried out a temperature of about 10° C. to about 40° C.

Aspect 103. The process of Aspect 97, wherein the reacting is carried out a temperature of about 10° C. to about 30° C.

Aspect 104. The process of Aspect 97, wherein the reacting is carried out a temperature of about 15° C. to about 90° C.

Aspect 105. The process of Aspect 97, wherein the reacting is carried out a temperature of about 15° C. to about 80° C.

Aspect 106. The process of Aspect 97, wherein the reacting is carried out a temperature of about 15° C. to about 70° C.

Aspect 107. The process of Aspect 97, wherein the reacting is carried out a temperature of about 15° C. to about 60° C.

Aspect 108. The process of Aspect 97, wherein the reacting is carried out a temperature of about 15° C. to about 50° C.

Aspect 109. The process of Aspect 97, wherein the reacting is carried out a temperature of about 15° C. to about 40° C.

Aspect 110. The process of Aspect 97, wherein the reacting is carried out a temperature of about 15° C. to about 30° C.

Aspect 111. The process of Aspect 97, wherein the reacting is carried out a temperature of about 15° C. to about 25° C.

Aspect 112. The process of Aspect 97, wherein the reacting is carried out a temperature of about 20° C. to about 80° C.

Aspect 113. The process of Aspect 97, wherein the reacting is carried out a temperature of about 20° C. to about 80° C.

Aspect 114. The process of Aspect 97, wherein the reacting is carried out a temperature of about 20° C. to about 70° C.

Aspect 115. The process of Aspect 97, wherein the reacting is carried out a temperature of about 20° C. to about 60° C.

Aspect 116. The process of Aspect 97, wherein the reacting is carried out a temperature of about 20° C. to about 50° C.

Aspect 117. The process of Aspect 97, wherein the reacting is carried out a temperature of about 20° C. to about 40° C.

Aspect 118. The process of Aspect 97, wherein the reacting is carried out a temperature of about 20° C. to about 35° C.

Aspect 119. The process of Aspect 97, wherein the reacting is carried out a temperature of about 20° C. to about 30° C.

Aspect 120. The process of Aspect 97, wherein the reacting is carried out a temperature of about 20° C. to about 25° C.

Aspect 121. The process of Aspect 97, wherein the reacting is carried out a temperature of about 25° C. to about 40° C.

Aspect 122. The process of Aspect 97, wherein the reacting is carried out a temperature of about 25° C. to about 35° C.

Aspect 123. The process of Aspect 97, wherein the reacting is carried out a temperature of about 25° C. to about 30° C.

Aspect 124. The process of any one of Aspect 71-Aspect 123, wherein the reacting is carried out for a period of time from about 30 minutes hour to about 72 hours.

Aspect 125. The process of any one of Aspect 124, wherein the reacting is carried out for a period of time from about 1 hour to about 72 hours.

Aspect 126. The process of any one of Aspect 124, wherein the reacting is carried out for a period of time from about 6 hours to about 72 hours.

Aspect 127. The process of any one of Aspect 124, wherein the reacting is carried out for a period of time from about 12 hours to about 72 hours.

Aspect 128. The process of any one of Aspect 124, wherein the reacting is carried out for a period of time from about 24 hours to about 72 hours.

Aspect 129. The process of any one of Aspect 124, wherein the reacting is carried out for a period of time from about 30 minutes to about 48 hours.

Aspect 130. The process of any one of Aspect 124, wherein the reacting is carried out for a period of time from about 1 hour to about 48 hours.

Aspect 131. The process of any one of Aspect 124, wherein the reacting is carried out for a period of time from about 6 hours to about 48 hours.

Aspect 132. The process of any one of Aspect 124, wherein the reacting is carried out for a period of time from about 12 hours to about 48 hours.

Aspect 133. The process of any one of Aspect 124, wherein the reacting is carried out for a period of time from about 24 hours to about 48 hours.

Aspect 134. The process of any one of Aspect 124, wherein the reacting is carried out for a period of time from about 30 minutes to about 24 hours.

Aspect 135. The process of any one of Aspect 124, wherein the reacting is carried out for a period of time from about 30 minutes to about 24 hours.

Aspect 136. The process of any one of Aspect 124, wherein the reacting is carried out for a period of time from about 1 hour to about 24 hours.

Aspect 137. The process of any one of Aspect 124, wherein the reacting is carried out for a period of time from about 2 hours to about 24 hours.

Aspect 138. The process of any one of Aspect 124, wherein the reacting is carried out for a period of time from about 3 hours to about 24 hours.

Aspect 139. The process of any one of Aspect 124, wherein the reacting is carried out for a period of time from about 4 hours to about 24 hours.

Aspect 140. The process of any one of Aspect 124, wherein the reacting is carried out for a period of time from about 5 hours to about 24 hours.

Aspect 141. The process of any one of Aspect 124, wherein the reacting is carried out for a period of time from about 6 hours to about 24 hours.

Aspect 142. The process of any one of Aspect 124, wherein the reacting is carried out for a period of time from about 12 hours to about 24 hours.

Aspect 143. The process of any one of Aspect 124, wherein the reacting is carried out for a period of time from about 30 minutes to about 12 hours.

Aspect 144. The process of any one of Aspect 124, wherein the reacting is carried out for a period of time from about 1 hour to about 12 hours.

Aspect 145. The process of any one of Aspect 124, wherein the reacting is carried out for a period of time from about 2 hours to about 12 hours.

Aspect 146. The process of any one of Aspect 124, wherein the reacting is carried out for a period of time from about 3 hours to about 12 hours.

Aspect 147. The process of any one of Aspect 124, wherein the reacting is carried out for a period of time from about 4 hours to 12 hours.

Aspect 148. The process of any one of Aspect 124, wherein the reacting is carried out for a period of time from about 5 hours to about 12 hours.

Aspect 149. The process of any one of Aspect 124, wherein the reacting is carried out for a period of time from about 6 hours to about 12 hours.

Aspect 150. The process of any one of Aspect 71-Aspect 149, further comprising forming a dried mixture comprising the metal oxide and the metal compound solution; wherein the forming the dried mixture comprising the metal oxide and the metal compound comprises heating at a temperature of from about 70° C. to about 200° C. for a period of time sufficient to remove substantially all of the solvent.

Aspect 151. The process of Aspect 150, wherein the forming the dried mixture comprising the metal oxide and the metal compound comprises heating at a temperature of from about 80° C. to about 150° C.

Aspect 152. The process of Aspect 150, wherein the forming the dried mixture comprising the metal oxide and the metal compound comprises heating at a temperature of from 90° C. to about 130° C.

Aspect 153. The process of Aspect 150, wherein the forming the dried mixture comprising the metal oxide and the metal compound comprises heating at a temperature of from 90° C. to about 120° C.

Aspect 154. The process of Aspect 150, wherein the forming the dried mixture comprising the metal oxide and the metal compound comprises heating at a temperature of from 90° C. to about 110° C.

Aspect 155. The process of Aspect 150, wherein the forming the dried mixture comprising the metal oxide and the metal compound comprises heating at a temperature of from 95° C. to about 120° C.

Aspect 156. The process of Aspect 150, wherein the forming the dried mixture comprising the metal oxide and the metal compound comprises heating at a temperature of from 95° C. to about 115° C.

Aspect 157. The process of Aspect 150, wherein the forming the dried mixture comprising the metal oxide and the metal compound comprises heating at a temperature of from 95° C. to about 110° C.

Aspect 158. The process of Aspect 150, wherein the forming the dried mixture comprising the metal oxide and the metal compound comprises heating at a temperature of from 95° C. to about 105° C.

Aspect 159. The process of any one of Aspect 150-Aspect 158, wherein the forming the dried mixture comprising the metal oxide and the metal compound comprises heating at ambient pressure.

Aspect 160. The process of any one of Aspect 150-Aspect 158, wherein the forming the dried mixture comprising the metal oxide and the metal compound comprises heating at about 700 torr to about 900 torr.

Aspect 161. The process of any one of Aspect 150-Aspect 158, wherein the forming the dried mixture comprising the metal oxide and the metal compound comprises heating at about 100 torr to about 700 torr.

Aspect 162. The process of any one of Aspect 150-Aspect 161, wherein the forming the dried mixture comprising the metal oxide and the metal compound comprises heating in air.

Aspect 163. The process of any one of Aspect 71-Aspect 162, further comprising calcining the heterogeneous catalyst.

Aspect 164. The process of Aspect 163, wherein the calcining the heterogeneous catalyst is calcining the dried mixture comprising the metal oxide and the metal compound of any one of Aspect 150-Aspect 162.

Aspect 165. The process of Aspect 163 or Aspect 164 wherein the calcining the heterogeneous catalyst comprises heating at a calcining temperature of about 200° C. to about 1000° C. for a period of time sufficient to calcine the heterogeneous catalyst.

Aspect 166. The process of Aspect 165, wherein the calcining temperature is about 300° C. to about 900° C.

Aspect 167. The process of Aspect 165, wherein the calcining temperature is about 350° C. to about 850° C.

Aspect 168. The process of Aspect 165, wherein the calcining temperature is about 400° C. to about 800° C.

Aspect 169. The process of Aspect 165, wherein the calcining temperature is about 300° C. to about 700° C.

Aspect 170. The process of Aspect 165, wherein the calcining temperature is about 350° C. to about 700° C.

Aspect 171. The process of Aspect 165, wherein the calcining temperature is about 400° C. to about 700° C.

Aspect 172. The process of Aspect 165, wherein the calcining temperature is about 450° C. to about 700° C.

Aspect 173. The process of Aspect 165, wherein the calcining temperature is about 500° C. to about 700° C.

Aspect 174. The process of Aspect 165, wherein the calcining temperature is about 300° C. to about 600° C.

Aspect 175. The process of Aspect 165, wherein the calcining temperature is about 350° C. to about 600° C.

Aspect 176. The process of Aspect 165, wherein the calcining temperature is about 400° C. to about 600° C.

Aspect 177. The process of Aspect 165, wherein the calcining temperature is about 450° C. to about 600° C.

Aspect 178. The process of Aspect 165, wherein the calcining temperature is about 500° C. to about 600° C.

Aspect 179. The process of Aspect 165, wherein the calcining temperature is about 300° C. to about 550° C.

Aspect 180. The process of Aspect 165, wherein the calcining temperature is about 350° C. to about 550° C.

Aspect 181. The process of Aspect 165, wherein the calcining temperature is about 400° C. to about 550° C.

Aspect 182. The process of Aspect 165, wherein the calcining temperature is about 450° C. to about 550° C.

Aspect 183. The process of Aspect 165, wherein the calcining temperature is about 500° C. to about 550° C.

Aspect 184. The process of any one of Aspect 165-Aspect 183, wherein the heating at a calcining temperature comprises heating at a rate of about 0.5° C./min to about 20° C./min until the calcining temperature is reached; and wherein once the calcining temperature is reached the heating is maintained at the calcining temperature.

Aspect 185. The process of Aspect 184, wherein the heating at a calcining temperature comprises heating at a rate of about 0.5° C./min to about 15° C./min until the calcining temperature is reached.

Aspect 186. The process of Aspect 184, wherein the heating at a calcining temperature comprises heating at a rate of about 0.5° C./min to about 10° C./min until the calcining temperature is reached.

Aspect 187. The process of Aspect 184, wherein the heating at a calcining temperature comprises heating at a rate of about 0.5° C./min to about 5° C./min until the calcining temperature is reached.

Aspect 188. The process of Aspect 184, wherein the heating at a calcining temperature comprises heating at a rate of about 0.5° C./min to about 2.5° C./min until the calcining temperature is reached.

Aspect 189. The process of Aspect 184, wherein the heating at a calcining temperature comprises heating at a rate of about 0.5° C./min to about 2.0° C./min until the calcining temperature is reached.

Aspect 190. The process of Aspect 184, wherein the heating at a calcining temperature comprises heating at a rate of about 0.5° C./min to about 1.5° C./min C until the calcining temperature is reached.

Aspect 191. The process of Aspect 184, wherein the heating at a calcining temperature comprises heating at a rate of about 0.5° C./min to about 1° C./min until the calcining temperature is reached.

Aspect 192. The process of Aspect 184, wherein the heating at a calcining temperature comprises heating at a rate of about 1° C./min to about 7° C./min until the calcining temperature is reached.

Aspect 193. The process of Aspect 184, wherein the heating at a calcining temperature comprises heating at a rate of about 1.5° C./min to about 7° C./min until the calcining temperature is reached.

Aspect 194. The process of Aspect 184, wherein the heating at a calcining temperature comprises heating at a rate of about 2° C./min to about 7° C./min until the calcining temperature is reached.

Aspect 195. The process of Aspect 184, wherein the heating at a calcining temperature comprises heating at a rate of about 2.5° C./min to about 7° C./min until the calcining temperature is reached.

Aspect 196. The process of Aspect 184, wherein the heating at a calcining temperature comprises heating at a rate of about 1° C./min to about 6° C./min until the calcining temperature is reached.

Aspect 197. The process of Aspect 184, wherein the heating at a calcining temperature comprises heating at a rate of about 1.5° C./min to about 6° C./min until the calcining temperature is reached.

Aspect 198. The process of Aspect 184, wherein the heating at a calcining temperature comprises heating at a rate of about 2° C./min to about 6° C./min until the calcining temperature is reached.

Aspect 199. The process of Aspect 184, wherein the heating at a calcining temperature comprises heating at a rate of about 2.5° C./min to about 6° C./min until the calcining temperature is reached.

Aspect 200. The process of Aspect 184, wherein the heating at a calcining temperature comprises heating at a rate of about 1° C./min until the calcining temperature is reached.

Aspect 201. The process of Aspect 184, wherein the heating at a calcining temperature comprises heating at a rate of about 5° C./min until the calcining temperature is reached.

Aspect 202. A heterogeneous catalyst prepared by the process of any one of Aspect 71-Aspect 201.

Aspect 203. A process for the synthesis of ammonia, comprising: providing a reaction chamber with the heterogeneous catalyst of any of Aspects 1-Aspect 70, or the heterogeneous catalyst made by the process of any one of Aspect 71-Aspect 201; conveying a flow of a reactant gas mixture into the reaction chamber via an entry port; wherein the reaction chamber is at a pressure of about 700 torr to about 900 torr; contacting the reactant gas mixture and the heterogeneous catalyst; heating the heterogeneous catalyst using microwave energy; reacting the reactant gas mixture in contact with the heterogeneous catalyst, thereby providing a product gas mixture; and wherein the heterogeneous catalyst has a heterogeneous catalyst temperature of from about 50° C. to about 1000° C.; wherein the reactant gas mixture comprises nitrogen and hydrogen; wherein the product gas mixture comprises ammonia; conveying the product gas mixture from the reaction chamber via an exit port.

Aspect 204. The process of Aspect 203, wherein the reactant gas mixture comprises about 15 vol % to about 25 vol % of nitrogen; and about 45 vol % to about 75 vol % of hydrogen; provided that the vol % ratio of nitrogen to hydrogen is about 1 to about 5 and the total vol % of all gases in the reactant gas mixture is equal to about 100 vol %.

Aspect 205. The process of Aspect 204, wherein the vol % ratio of nitrogen to hydrogen is about 2.5 to about 4.

Aspect 206. The process of Aspect 204, wherein the vol % ratio of nitrogen to hydrogen is about 2.5 to about 3.5.

Aspect 207. The process of Aspect 204, wherein the vol % ratio of nitrogen to hydrogen is about 2.8 to about 3.2.

Aspect 208. The process of Aspect 204, wherein the vol % ratio of nitrogen to hydrogen is about 3.0±20%.

Aspect 209. The process of Aspect 204, wherein the vol % ratio of nitrogen to hydrogen is about 3.0±15%.

Aspect 210. The process of Aspect 204, wherein the vol % ratio of nitrogen to hydrogen is about 3.0±10%.

Aspect 211. The process of Aspect 204, wherein the vol % ratio of nitrogen to hydrogen is about 3.0±5%.

Aspect 212. The process of any one of Aspect 204-Aspect 211, wherein the reactant gas mixture comprises about 18 vol % to about 24 vol % of nitrogen; and about 60 vol % to about 70 vol % of hydrogen.

Aspect 213. The process of Aspect 212, wherein the reactant gas mixture comprises about 19 vol % to about 23 vol % of nitrogen; and about 65 vol % to about 70 vol % of hydrogen.

Aspect 214. The process of Aspect 212, wherein the reactant gas mixture comprises about 20 vol % to about 23 vol % of nitrogen; and about 66 vol % to about 70 vol % of hydrogen.

Aspect 215. The process of Aspect 212, wherein the reactant gas mixture comprises about 22 vol %±20% of nitrogen; and about 68 vol %±20% of hydrogen.

Aspect 216. The process of any one of Aspect 204-Aspect 215, wherein the reactant gas mixture comprises less than about 5 vol % oxygen.

Aspect 217. The process of Aspect 216, wherein the reactant gas mixture comprises less than about 2.5 vol % oxygen.

Aspect 218. The process of Aspect 216, wherein the reactant gas mixture comprises less than about 1 vol % oxygen.

Aspect 219. The process of Aspect 216, wherein the reactant gas mixture comprises less than 0.5 vol % oxygen.

Aspect 220. The process of Aspect 216, wherein the reactant gas mixture is substantially free of oxygen.

Aspect 221. The process of any one of Aspect 203-Aspect 220, wherein the reactant gas mixture is pre-heated to a reactant gas mixture pre-heat temperature prior to conveying the flow of a reactant gas mixture into the reaction chamber via an entry port; and wherein the reactant gas mixture pre-heat temperature is from about 20° C. to about 500° C.

Aspect 222. The process of Aspect 221, wherein the reactant gas mixture pre-heat temperature is from about 50° C. to about 400° C.

Aspect 223. The process of Aspect 221, wherein the reactant gas mixture pre-heat temperature is from about 50° C. to about 300° C.

Aspect 224. The process of Aspect 221, wherein the reactant gas mixture pre-heat temperature is from about 50° C. to about 200° C.

Aspect 225. The process of Aspect 221, wherein the reactant gas mixture pre-heat temperature is from about 100° C. to about 500° C.

Aspect 226. The process of Aspect 221, wherein the reactant gas mixture pre-heat temperature is from about 100° C. to about 400° C.

Aspect 227. The process of Aspect 221, wherein the reactant gas mixture pre-heat temperature is from about 100° C. to about 300° C.

Aspect 228. The process of Aspect 221, wherein the reactant gas mixture pre-heat temperature is from about 100° C. to about 200° C.

Aspect 229. The process of Aspect 221, wherein the reactant gas mixture pre-heat temperature is from about 150° C. to about 500° C.

Aspect 230. The process of Aspect 221, wherein the reactant gas mixture pre-heat temperature is from about 150° C. to about 400° C.

Aspect 231. The process of Aspect 221, wherein the reactant gas mixture pre-heat temperature is from about 150° C. to about 300° C.

Aspect 232. The process of Aspect 221, wherein the reactant gas mixture pre-heat temperature is from about 150° C. to about 200° C.

Aspect 233. The process of Aspect 221, wherein the reactant gas mixture pre-heat temperature is from about 200° C. to about 500° C.

Aspect 234. The process of Aspect 221, wherein the reactant gas mixture pre-heat temperature is from about 200° C. to about 400° C.

Aspect 235. The process of Aspect 221, wherein the reactant gas mixture pre-heat temperature is from about 200° C. to about 300° C.

Aspect 236. The process of any one of Aspect 203-Aspect 235, wherein the heating the reaction chamber is using microwave energy induces plasma formation.

Aspect 237. The process of Aspect 236, wherein plasma formation induces ionization of nitrogen, hydrogen, or both.

Aspect 238. The process of Aspect 237, wherein ionization of nitrogen, hydrogen, or both is associated with reaction over the catalyst surface to form ammonia under low reaction severity and enhanced ammonia yield.

Aspect 239. The process of any one of Aspect 203-Aspect 238, wherein the heating the reaction chamber is using microwave energy having at a frequency of about 1 MHz to about 50 GHz.

Aspect 240. The process of Aspect 239, wherein the microwave energy has a frequency of about 2 MHz to about 50 GHz.

Aspect 241. The process of Aspect 239, wherein the microwave energy has a frequency of about 2 MHz to about 40 GHz.

Aspect 242. The process of Aspect 239, wherein the microwave energy has a frequency of about 2 MHz to about 30 GHz.

Aspect 243. The process of Aspect 239, wherein the microwave energy has a frequency of about 2 MHz to about 25 GHz.

Aspect 244. The process of Aspect 239, wherein the microwave energy has a frequency of about 2 MHz to about 20 GHz.

Aspect 245. The process of Aspect 239, wherein the microwave energy has a frequency of about 2 MHz to about 15 GHz.

Aspect 246. The process of Aspect 239, wherein the microwave energy has a frequency of about 3 MHz to about 10 GHz.

Aspect 247. The process of Aspect 239, wherein the microwave energy has a frequency of about 4 GHz to about 7 GHz.

Aspect 248. The process of Aspect 239, wherein the microwave energy has a frequency of about 5 GHz to about 7 GHz.

Aspect 249. The process of Aspect 239, wherein the microwave energy has a frequency of about 5 GHz to about 6 GHz.

Aspect 250. The process of Aspect 239, wherein the microwave energy has a frequency of about 0.7 GHz to about 3 GHz.

Aspect 251. The process of Aspect 239, wherein the microwave energy has a frequency of about 0.9 GHz to about 2.5 GHz.

Aspect 252. The process of any one of Aspect 203-Aspect 251, wherein the heterogeneous catalyst temperature is from about 50° C. to about 500° C.

Aspect 253. The process of Aspect 252, wherein the heterogeneous catalyst temperature is from about 50° C. to about 400° C.

Aspect 254. The process of Aspect 252, wherein the heterogeneous catalyst temperature is from about 50° C. to about 300° C.

Aspect 255. The process of Aspect 252, wherein the heterogeneous catalyst temperature is from about 50° C. to about 200° C.

Aspect 256. The process of Aspect 252, wherein the heterogeneous catalyst temperature is from about 100° C. to about 500° C.

Aspect 257. The process of Aspect 252, wherein the heterogeneous catalyst temperature is from about 100° C. to about 400° C.

Aspect 258. The process of Aspect 252, wherein the heterogeneous catalyst temperature is from about 100° C. to about 300° C.

Aspect 259. The process of Aspect 252, wherein the heterogeneous catalyst temperature is from about 100° C. to about 200° C.

Aspect 260. The process of Aspect 252, wherein the heterogeneous catalyst temperature is from about 150° C. to about 500° C.

Aspect 261. The process of Aspect 252, wherein the heterogeneous catalyst temperature is from about 150° C. to about 400° C.

Aspect 262. The process of Aspect 252, wherein the heterogeneous catalyst temperature is from about 150° C. to about 300° C.

Aspect 263. The process of Aspect 252, wherein the heterogeneous catalyst temperature is from about 150° C. to about 200° C.

Aspect 264. The process of Aspect 252, wherein the heterogeneous catalyst temperature is from about 200° C. to about 500° C.

Aspect 265. The process of Aspect 252, wherein the heterogeneous catalyst temperature is from about 200° C. to about 400° C.

Aspect 266. The process of Aspect 252, wherein the heterogeneous catalyst temperature is from about 200° C. to about 300° C.

Aspect 267. The process of any one Aspect 203-Aspect 266, wherein the product gas mixture has an ammonia concentration of about 10 ppm to about 30 vol %.

Aspect 268. The process of Aspect 267, wherein the product gas mixture has an ammonia concentration of about 1,000 ppm to about 30 vol %.

Aspect 269. The process of Aspect 267, wherein the product gas mixture has an ammonia concentration of about 1,000 ppm to about 25 vol %.

Aspect 270. The process of Aspect 267, wherein the product gas mixture has an ammonia concentration of about 1,000 ppm to about 20 vol %.

Aspect 271. The process of Aspect 267, wherein the product gas mixture has an ammonia concentration of about 1,000 ppm to about 10 vol %.

Aspect 272. The process of Aspect 267, wherein the product gas mixture has an ammonia concentration of about 1,000 ppm to about 4,000 ppm.

Aspect 273. The process of Aspect 267, wherein the product gas mixture has an ammonia concentration of about 1,000 ppm to about 3,000 ppm.

Aspect 274. The process of Aspect 267, wherein the product gas mixture has an ammonia concentration of about 1,000 ppm to about 2,500 ppm.

Aspect 275. The process of Aspect 267, wherein the product gas mixture has an ammonia concentration of about 1,000 ppm to about 5,000 ppm.

Aspect 276. The process of any one Aspect 203-Aspect 275, wherein the process yields ammonia at about 0.001 $g_{NH3}/(g_{catalyst} \cdot hour)$ to about 2 $g_{NH3}$ ($g_{catalyst} \cdot hour$).

Aspect 277. The process of Aspect 276, wherein the process yields ammonia at about 0.01 $g_{NH3}/(g_{catalyst} \cdot hour)$ to about 1.5 $g_{NH3}/(g_{catalyst} \cdot hour)$.

Aspect 278. The process of Aspect 276, wherein the process yields ammonia at about 0.01 $g_{NH3}/(g_{catalyst} \cdot hour)$ to about 1 $g_{NH3}/(g_{catalyst} \cdot hour)$.

Aspect 279. The process of Aspect 276, wherein the process yields ammonia at about 0.01 $g_{NH3}$ ($g_{catalyst} \cdot hour$) to about 0.75 $g_{NH3}/(g_{catalyst} \cdot hour)$.

Aspect 280. The process of Aspect 276, wherein the process yields ammonia at about 0.01 $g_{NH3}/(g_{catalyst} \cdot hour)$ to about 0.5 $g_{NH3}/(g_{catalyst} \cdot hour)$.

Aspect 281. The process of Aspect 276, wherein the process yields ammonia at about 0.01 $g_{NH3}/(g_{catalyst} \cdot hour)$ to about 0.3 $g_{NH3}/(g_{catalyst} \cdot hour)$.

Aspect 282. The process of Aspect 276, wherein the process yields ammonia at about 0.01 $g_{NH3}/(g_{catalyst} \cdot hour)$ to about 0.25 $g_{NH3}/(g_{catalyst} \cdot hour)$.

Aspect 283. The process of Aspect 276, wherein the process yields ammonia at about 0.01 $g_{NH3}/(g_{catalyst} \cdot hour)$ to about 0.2 $g_{NH3}/(g_{catalyst} \cdot hour)$.

Aspect 284. The process of Aspect 276, wherein the process yields ammonia at about 0.01 $g_{NH3}/(g_{catalyst} \cdot hour)$ to about 0.15 $g_{NH3}/(g_{catalyst} \cdot hour)$.

Aspect 285. The process of Aspect 276, wherein the process yields ammonia at about 0.01 $g_{NH3}/(g_{catalyst} \cdot hour)$ to about 0.1 $g_{NH3}/(g_{catalyst} \cdot hour)$.

Aspect 286. The process of any one Aspect 203-Aspect 285, wherein the reaction chamber has a pressure of from about 2 torr to about 20 atm.

Aspect 287. The process of Aspect 286, wherein the reaction chamber has a pressure of from about 1 atm to about 15 atm.

Aspect 288. The process of Aspect 286, wherein the reaction chamber has a pressure of from about 1 atm to about 10 atm.

Aspect 289. The process of Aspect 286, wherein the reaction chamber has a pressure of from about 1 atm to about 7.5 atm.

Aspect 290. The process of Aspect 286, wherein the reaction chamber has a pressure of from about 1 atm to about 5 atm.

Aspect 291. The process of Aspect 286, wherein the reaction chamber has a pressure of from about 1 atm to about 2.5 atm.

Aspect 292. The process of Aspect 286, wherein the reaction chamber has a pressure of from about 600 torr to about 800 torr.

Aspect 293. The process of Aspect 286, wherein the reaction chamber has a pressure about the same as ambient pressure.

Aspect 294. The process of any one Aspect 203-Aspect 293, wherein the process is carried out in a continuous flow mode.

Aspect 295. The process of Aspect 294, wherein process is carried out at a Gas Hour Space Velocity (GHSV) of about 500 $h^{-1}$ to about 50,000 $h^{-1}$.

Aspect 296. The process of Aspect 295, wherein the Gas Hour Space Velocity (GHSV) is about 500 $h^{-1}$ to about 40,000 $h^{-1}$.

Aspect 297. The process of Aspect 295, wherein the Gas Hour Space Velocity (GHSV) is about 500 $h^{-1}$ to about 35,000 $h^{-1}$.

Aspect 298. The process of Aspect 295, wherein the Gas Hour Space Velocity (GHSV) is about 500 $h^{-1}$ to about 30,000 $h^{-1}$.

Aspect 299. The process of Aspect 295, wherein the Gas Hour Space Velocity (GHSV) is about 500 $h^{-1}$ to about 25,000 $h^{-1}$.

Aspect 300. The process of Aspect 295, wherein the Gas Hour Space Velocity (GHSV) is about 500 $h^{-1}$ to about 20,000 $h^{-1}$.

Aspect 301. The process of Aspect 295, wherein the Gas Hour Space Velocity (GHSV) is about 1,000 $h^{-1}$ to about 30,000 $h^{-1}$.

Aspect 302. The process of Aspect 295, wherein the Gas Hour Space Velocity (GHSV) is about 1,000 $h^{-1}$ to about 25,000 $h^{-1}$.

Aspect 303. The process of Aspect 295, wherein the Gas Hour Space Velocity (GHSV) is about 1,000 $h^{-1}$ to about 20,000 $h^{-1}$.

Aspect 304. The process of Aspect 295, wherein the Gas Hour Space Velocity (GHSV) is about 1,100 $h^{-1}$ to about 20,000 $h^{-1}$.

Aspect 305. The process of Aspect 295, wherein the Gas Hour Space Velocity (GHSV) is about 1,200 $h^{-1}$ to about 20,000 $h^{-1}$.

Aspect 306. The process of Aspect 295, wherein the Gas Hour Space Velocity (GHSV) is about 1,000 $h^{-1}$ to about 19,000 $h^{-1}$.

Aspect 307. The process of Aspect 295, wherein the Gas Hour Space Velocity (GHSV) is about 1,100 $h^{-1}$ to about 19,000 $h^{-1}$.

Aspect 308. The process of Aspect 295, wherein the Gas Hour Space Velocity (GHSV) is about 1,200 $h^{-1}$ to about 19,000 $h^{-1}$.

Aspect 309. The process of Aspect 295, wherein the Gas Hour Space Velocity (GHSV) is about 1,000 $h^{-1}$ to about 17,000 $h^{-1}$.

Aspect 310. The process of Aspect 295, wherein the Gas Hour Space Velocity (GHSV) is about 1,100 $h^{-1}$ to about 17,000 $h^{-1}$.

Aspect 311. The process of Aspect 295, wherein the Gas Hour Space Velocity (GHSV) is about 1,200 $h^{-1}$ to about 17,000 $h^{-1}$.

Aspect 312. The process of Aspect 295, wherein the Gas Hour Space Velocity (GHSV) is about 1,000 $h^{-1}$ to about 15,000 $h^{-1}$.

Aspect 313. The process of Aspect 295, wherein the Gas Hour Space Velocity (GHSV) is about 1,100 h$^{-1}$ to about 15,000 h$^{-1}$.

Aspect 314. The process of Aspect 295, wherein the Gas Hour Space Velocity (GHSV) is about 1,200 h$^{-1}$ to about 15,000 h$^{-1}$.

Aspect 315. The process of any one Aspect 203-Aspect 286, wherein the process is carried out in a batch processing mode.

Aspect 316. The process of Aspect 315, wherein the residence time of the reactant gas mixture in the reaction chamber is from about 0.1 minute to about 3 hours.

Aspect 317. The process of Aspect 316, wherein the residence time of the reactant gas mixture in the reaction chamber is from about 1 minute to about 3 hours.

Aspect 318. The process of Aspect 316, wherein the residence time of the reactant gas mixture in the reaction chamber is from about 1 minute to about 2.5 hours.

Aspect 319. The process of Aspect 316, wherein the residence time of the reactant gas mixture in the reaction chamber is from about 1 minute to about 2 hours.

Aspect 320. The process of Aspect 316, wherein the residence time of the reactant gas mixture in the reaction chamber is from about 1 minute to about 1.5 hours.

Aspect 321. The process of Aspect 316, wherein the residence time of the reactant gas mixture in the reaction chamber is from about 1 minute to about 1 hour.

Aspect 322. The process of Aspect 316, wherein the residence time of the reactant gas mixture in the reaction chamber is from about 2 minutes to about 3 hours.

Aspect 323. The process of Aspect 316, wherein the residence time of the reactant gas mixture in the reaction chamber is from about 2 minutes to about 2.5 hours.

Aspect 324. The process of Aspect 316, wherein the residence time of the reactant gas mixture in the reaction chamber is from about 2 minutes to about 2 hours.

Aspect 325. The process of Aspect 316, wherein the residence time of the reactant gas mixture in the reaction chamber is from about 2 minutes to about 1.5 hours.

Aspect 326. The process of Aspect 316, wherein the residence time of the reactant gas mixture in the reaction chamber is from about 2 minutes to about 1 hour.

Aspect 327. The process of Aspect 316, wherein the residence time of the reactant gas mixture in the reaction chamber is from about 5 minutes to about 3 hours.

Aspect 328. The process of Aspect 316, wherein the residence time of the reactant gas mixture in the reaction chamber is from about 5 minutes to about 2.5 hours.

Aspect 329. The process of Aspect 316, wherein the residence time of the reactant gas mixture in the reaction chamber is from about 5 minutes to about 2 hours.

Aspect 330. The process of Aspect 316, wherein the residence time of the reactant gas mixture in the reaction chamber is from about 5 minutes to about 1.5 hours.

Aspect 331. The process of Aspect 316, wherein the residence time of the reactant gas mixture in the reaction chamber is from about 5 minutes to about 1 hour.

Aspect 332. The process of any one of Aspect 203-Aspect 331, wherein the reaction chamber is a reaction chamber in a fixed-bed quartz reactor.

Aspect 333. The process of Aspect 332, wherein the fixed-bed quartz reactor comprises a microwave energy apparatus configured to provide microwave energy to the reaction chamber of the fixed-bed quartz reactor.

Aspect 334. The process of any one of Aspect 203-Aspect 333, further comprising reducing the heterogeneous catalyst prior providing the reaction chamber with the heterogeneous catalyst of any of Aspects 1-Aspect 70, or the heterogeneous catalyst made by the process of any one of Aspect 71-Aspect 201.

Aspect 335. The process of Aspect 334, wherein the reducing the heterogeneous catalyst comprises conveying a flow of a first reducing gas comprising hydrogen such that the first reducing gas comprising hydrogen contacts the heterogeneous catalyst; and heating the heterogeneous catalyst at a first catalyst reducing temperature from about 100° C. to about 1,000° C. for first catalyst reducing period of time sufficient to reduce at least 80 wt % of the metal to metal (0) form or the metal in elemental form.

Aspect 336. The process of Aspect 335, wherein the first catalyst reducing temperature is from about 100° C. to about 900° C.

Aspect 337. The process of Aspect 335, wherein the first catalyst reducing temperature is from about 100° C. to about 800° C.

Aspect 338. The process of Aspect 335, wherein the first catalyst reducing temperature is from about 100° C. to about 700° C.

Aspect 339. The process of Aspect 335, wherein the first catalyst reducing temperature is from about 100° C. to about 600° C.

Aspect 340. The process of Aspect 335, wherein the first catalyst reducing temperature is from about 100° C. to about 500° C.

Aspect 341. The process of Aspect 335, wherein the first catalyst reducing temperature is from about 200° C. to about 900° C.

Aspect 342. The process of Aspect 335, wherein the first catalyst reducing temperature is from about 200° C. to about 800° C.

Aspect 343. The process of Aspect 335, wherein the first catalyst reducing temperature is from about 200° C. to about 700° C.

Aspect 344. The process of Aspect 335, wherein the first catalyst reducing temperature is from about 300° C. to about 700° C.

Aspect 345. The process of Aspect 335, wherein the first catalyst reducing temperature is from about 400° C. to about 700° C.

Aspect 346. The process of Aspect 335, wherein the first catalyst reducing temperature is from about 200° C. to about 600° C.

Aspect 347. The process of Aspect 335, wherein the first catalyst reducing temperature is from about 300° C. to about 600° C.

Aspect 348. The process of Aspect 335, wherein the first catalyst reducing temperature is from about 400° C. to about 600° C.

Aspect 349. The process of Aspect 335, wherein the first catalyst reducing temperature is from about 200° C. to about 500° C.

Aspect 350. The process of Aspect 335, wherein the first catalyst reducing temperature is from about 300° C. to about 500° C.

Aspect 351. The process of Aspect 335, wherein the first catalyst reducing temperature is from about 400° C. to about 500° C.

Aspect 352. The process of Aspect 335, wherein the first catalyst reducing temperature is from about 200° C. to about 450° C.

Aspect 353. The process of Aspect 335, wherein the first catalyst reducing temperature is from about 300° C. to about 450° C.

Aspect 354. The process of Aspect 335, wherein the first catalyst reducing temperature is from about 400° C. to about 450° C.

Aspect 355. The process of any one of Aspect 335-Aspect 354, wherein the first catalyst reducing period of time is about 15 minutes to about 24 hours.

Aspect 356. The process of Aspect 355, wherein the first catalyst reducing period of time is about 30 min to about 12 hours.

Aspect 357. The process of Aspect 355, wherein the first catalyst reducing period of time is about 1 hour to about 12 hours.

Aspect 358. The process of Aspect 355, wherein the first catalyst reducing period of time is about 1 hour to about 6 hours.

Aspect 359. The process of Aspect 355, wherein the first catalyst reducing period of time is about 1 hour to about 4 hours.

Aspect 360. The process of any one of Aspect 335-Aspect 359, wherein the first reducing gas is conveyed at a flow rate of about 10 mL/min to about 200 mL/min.

Aspect 361. The process of Aspect 360, wherein the first reducing gas is conveyed at a flow rate of about 25 mL/min to about 150 mL/min.

Aspect 362. The process of Aspect 360, wherein the first reducing gas is conveyed at a flow rate of about 25 mL/min to about 100 mL/min.

Aspect 363. The process of Aspect 360, wherein the first reducing gas is conveyed at a flow rate of about 25 mL/min to about 75 mL/min.

Aspect 364. The process of Aspect 360, wherein the first reducing gas is conveyed at a flow rate of about 40 mL/min to about 60 mL/min.

Aspect 365. The process of any one of Aspect 335-Aspect 364, wherein the first reducing gas comprises at least 90 vol % hydrogen.

Aspect 366. The process of any one of Aspect 335-Aspect 364, wherein the first reducing gas comprises substantially only hydrogen.

Aspect 367. The process of any one of Aspect 335-Aspect 366, wherein at least 85 wt % of the metal is reduced to metal (0).

Aspect 368. The process of any one of Aspect 335-Aspect 366, wherein at least 90 wt % of the metal is reduced to metal (0).

Aspect 369. The process of any one of Aspect 335-Aspect 366, wherein at least 95 wt of the metal is reduced to metal (0).

Aspect 370. The process of any one of Aspect 335-Aspect 366, wherein substantially all of the metal is reduced to metal (0).

Aspect 371. The process of any one of Aspect 203-Aspect 370, further comprising reducing the heterogeneous catalyst of any of Aspects 1-Aspect 70, or the heterogeneous catalyst made by the process of any one of Aspect 71-Aspect 201, in the reaction chamber prior to conveying the flow of the reactant gas mixture into the reaction chamber.

Aspect 372. The process of Aspect 371, wherein the reducing the heterogeneous catalyst comprises conveying a flow of a second reducing gas comprising hydrogen such that the second reducing gas comprising hydrogen contacts the heterogeneous catalyst; and heating the heterogeneous catalyst using microwave energy at a second catalyst reducing temperature from about 100° C. to about 1,000° C. for second catalyst reducing period of time sufficient to reduce at least 80 wt % of the metal to metal (0).

Aspect 373. The process of Aspect 372, wherein the second catalyst reducing temperature is from about 100° C. to about 900° C.

Aspect 374. The process of Aspect 372, wherein the second catalyst reducing temperature is from about 100° C. to about 800° C.

Aspect 375. The process of Aspect 372, wherein the second catalyst reducing temperature is from about 100° C. to about 700° C.

Aspect 376. The process of Aspect 372, wherein the second catalyst reducing temperature is from about 100° C. to about 600° C.

Aspect 377. The process of Aspect 372, wherein the second catalyst reducing temperature is from about 100° C. to about 500° C.

Aspect 378. The process of Aspect 372, wherein the second catalyst reducing temperature is from about 200° C. to about 900° C.

Aspect 379. The process of Aspect 372, wherein the second catalyst reducing temperature is from about 200° C. to about 800° C.

Aspect 380. The process of Aspect 372, wherein the second catalyst reducing temperature is from about 200° C. to about 700° C.

Aspect 381. The process of Aspect 372, wherein the second catalyst reducing temperature is from about 300° C. to about 700° C.

Aspect 382. The process of Aspect 372, wherein the second catalyst reducing temperature is from about 400° C. to about 700° C.

Aspect 383. The process of Aspect 372, wherein the second catalyst reducing temperature is from about 200° C. to about 600° C.

Aspect 384. The process of Aspect 372, wherein the second catalyst reducing temperature is from about 300° C. to about 600° C.

Aspect 385. The process of Aspect 372, wherein the second catalyst reducing temperature is from about 400° C. to about 600° C.

Aspect 386. The process of Aspect 372, wherein the second catalyst reducing temperature is from about 200° C. to about 500° C.

Aspect 387. The process of Aspect 372, wherein the second catalyst reducing temperature is from about 300° C. to about 500° C.

Aspect 388. The process of Aspect 372, wherein the second catalyst reducing temperature is from about 400° C. to about 500° C.

Aspect 389. The process of Aspect 372, wherein the second catalyst reducing temperature is from about 200° C. to about 450° C.

Aspect 390. The process of Aspect 372, wherein the second catalyst reducing temperature is from about 300° C. to about 450° C.

Aspect 391. The process of Aspect 372, wherein the second catalyst reducing temperature is from about 400° C. to about 450° C.

Aspect 392. The process of any one of Aspect 372-Aspect 391, wherein the second catalyst reducing period of time is about 15 minutes to about 24 hours.

Aspect 393. The process of Aspect 392, wherein the second catalyst reducing period of time is about 30 min to about 12 hours.

Aspect 394. The process of Aspect 392, wherein the second catalyst reducing period of time is about 1 hour to about 12 hours.

Aspect 395. The process of Aspect 392, wherein the second catalyst reducing period of time is about 1 hour to about 6 hours.

Aspect 396. The process of Aspect 392, wherein the second catalyst reducing period of time is about 1 hour to about 4 hours.

Aspect 397. The process of any one of Aspect 372-Aspect 396, wherein the second reducing gas is conveyed at a flow rate of about 10 mL/min to about 200 mL/min.

Aspect 398. The process of Aspect 397, wherein the second reducing gas is conveyed at a flow rate of about 25 mL/min to about 150 mL/min.

Aspect 399. The process of Aspect 397, wherein the second reducing gas is conveyed at a flow rate of about 25 mL/min to about 100 mL/min.

Aspect 400. The process of Aspect 397, wherein the second reducing gas is conveyed at a flow rate of about 25 mL/min to about 75 mL/min.

Aspect 401. The process of Aspect 397, wherein the second reducing gas is conveyed at a flow rate of about 40 mL/min to about 60 mL/min.

Aspect 402. The process of any one of Aspect 372-Aspect 401, wherein the second reducing gas comprises at least 90 vol % hydrogen.

Aspect 403. The process of any one of Aspect 372-Aspect 401, wherein the second reducing gas comprises substantially only hydrogen.

Aspect 404. The process of any one of Aspect 372-Aspect 403, wherein at least 85 wt % of the metal is reduced to metal (0).

Aspect 405. The process of any one of Aspect 372-Aspect 403, wherein at least 90 wt % of the metal is reduced to metal (0).

Aspect 406. The process of any one of Aspect 372-Aspect 403, wherein at least 95 wt % of the metal is reduced to metal (0).

Aspect 407. The process of any one of Aspect 372-Aspect 403, wherein substantially all of the metal is reduced to metal (0).

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure

G. EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Catalyst Synthesis

Exemplary catalyst syntheses are described herein. The example methods were modified as appropriate to prepare catalysts with other wt % amounts of Ru and/or promoter materials.

4 wt % Ru/γ-$Al_2O_3$ Catalyst:

Pure γ-$Al_2O_3$ (obtained from Alfa Aesar) was calcined at 550° C. for 5 hours to remove the absorbed water and gas. A 4 wt % Ru/γ-$Al_2O_3$ catalyst was synthesized via an incipient wetness impregnation as follows. A 1.25 g amount of Ruthenium (III) nitrosylnitrate (Ru 31.3% min., Alfa Aesar) was completely dissolved in 6.5 mL of deionized water at ambient temperature. Subsequently, the dissolved solution was added to 10 g of the calcined γ-$Al_2O_3$ dropwise while continuously stirring with glass rod, and placing the slurry at ambient temperature for 24 hours. Then, the mixture was dried in the oven at 100° C. for 24 hours. Finally, the dried ample was calcined in a muffle oven at 550° C. for 6 hours at a heating rate of 1° C./min to obtain the oxidized 4 wt % Ru/γ-$Al_2O_3$ catalyst.

4 wt % Ru/MgO Catalyst:

4 wt % Ru/MgO catalyst was synthesized by an incipient wetness technique. Ruthenium (III) nitrosylnitrate was used as the source of Ru. Typically, the desired amount of Ru salt is dissolved in a solvent, e.g., deionized water, to prepare a Ru salt solution. The amount of solvent used was approximately sufficient to fill the pores of MgO. The Ru salt solution was added dropwise to MgO surface. After adding all Ru salt solution to MgO, the sample was dried in an oven at 100° C. for 12 hours, then calcined in air at 500° C. for 4 hours.

1 wt % K-1 wt % Ba-1 wt % Ce on 4 wt % Ru—MgO Catalyst:

1 wt % K-1 wt % Ba-1 wt % Ce on 4 wt % Ru—MgO catalyst was using a co-impregnation method. Briefly, with $KNO_B$, $Ba(NO_3)_2$, $Ce(NO_3)_3.6H_2O$, and Ruthenium(III) nitrosylnitrate were used as the metal precursors. Typically, was is added into the K, Ba, Ce, and Ru salt mixture solution (with corresponding metals amount), after 3 h of stirring, the suspension was left still, allowing for solvent evaporation. The dried catalyst was transferred to a furnace for further drying at 120° C. for 12 h and calcined at 500° C. for 4 h, with a heating rate of 5° C./min.

2. Catalyst Evaluation

For continuous-flow reaction, the catalytic performance of a, 4% Ru/γ-Al$_2$O$_3$ catalyst (particles: 212-500 μm, No. 35-No. 70 mesh) in ammonia production was carried out in a continuous-flow fixed-bed quartz reactor (OD12.7 mm*ID10.5 mm*L1219 mm) under atmospheric pressure and microwave. Microwave was applied to provide the heat for the reduction and the reaction. Before starting the reaction, the catalyst was pre-reduced in the fixed-bed continuous quartz reactor at 400° C. for 4 hours using pure H$_2$ with a flow rate of 50 mL/min. Subsequently, a certain amount of the pre-reduced 4% Ru/γ-Al$_2$O$_3$ catalyst was loaded in the quartz tubing reactor using quartz wool to block the two sides of the catalysts. Subsequently, the catalysts were reduced again to reach the full reduction with a pure H$_2$ flow rate of 100 mL/min at 400° C. for another 2 hours under microwave. Once the reduction was complete, the reaction was started. When the reaction temperature, flow rate of the reactant mixture gas, and the frequency reached the respective set points and stabilized for 30 min, the effluent gas was analyzed by Micro-GC (Inficon 3000, OV-1 column) and then trapped in an ice-water bath for 1 hour to collect NH$_3$ for further analysis. The pH value of the liquid sample was measured using a pH meter (Hach, HQ40d), and then NH$_3$ yield was calculated according to Equation 1, the unit is gNH$_3$/(gcat.·h):

$$NH_3 \text{ production (gNH}_3 / (gcat. \cdot h)) = \frac{\text{Weight of NH3(g)}}{\text{Weight of catalyst(g)} \times \text{Collection time (h)}}. \qquad \text{(Equation 1)}$$

For the batch reaction, the catalysts were reduced using the same procedure as described above. The reactant mixture gas was flowing though the quartz reactor to expel air for 0.5 hour. Subsequently, the effluent gas value was closed to let the reactant gas fill the quartz reactor until full, then, the input gas value was closed. The reaction temperature and frequency of the microwave was controlled by the programming. Once they reached their respective set points, different reaction time (flow, 10, 30, 60, 120 min) in the batch reactor was applied. The final gas was analyzed by the Micro-GC (Inficon, 3000) with OV-1 column. Argon was used as carrier gas and the column temperature was 90° C. and column pressure of 25 psi. The final NH$_3$ concentration was determined by the Micro-GC (Inficon 3000, OV-1 column) according to the NH$_3$ standard curve.

3. Catalyst Characterization

Temperature programmed reduction with H$_2$ (H$_2$-TPR) was performed using a MICROMERITICS Autochem 2950 fully automatic chemisorption analyzer. A catalyst sample with a mass of 0.05 g was pretreated under a He atmosphere with a heating rate of 10° C./min until reaching 300° C. and then cooled to 40° C. Subsequently, 10% H$_2$ in Ar flowed through the catalyst bed while the temperature was ramped from 40 to 900° C. at a heating rate of 10° C./min. The hydrogen consumption signal was measured by a thermal conductivity detector (TCD).

Powder X-ray diffraction (XRD) patterns of oxidized and reduced 4 wt % Ru/γ-Al$_2$O$_3$ catalysts was performed on a PANalytical X'Pert Pro X-ray diffraction working at 45 kV and 40 mA using Cu Kα radiation (λ=1.5406 Å) at 2θ ranging from 10 and 90° with a step size of 0.02°. The diffraction lines were identified by matching them with reference patterns in the Joint Committee on Powder Diffraction Standards (JCPDS) database.

TEM images of reduced 4 wt % Ru/γ-Al$_2$O$_3$ catalyst were observed on a JEOL TEM 2100 electron microscope operating at 200 kV. Very small amount of sample powder was dispersed in pure isopropanol and sonicated for 1 hour. Subsequently, 1-2 drops of the suspension was dropped and evaporated on a nickel mesh 200 grid for TEM analysis.

The morphology of reduced 4 wt % Ru/γ-Al$_2$O$_3$ catalyst was investigated using a field emission scanning electron microscope (SEM, JEOL JSM-7600F) at an acceleration voltage of 40 kV and 40 mA.

The XPS spectra of reduced 4 wt % Ru/γ-Al$_2$O$_3$ catalyst were measure with a Physical Electronics PHI 5000 VersaProbe X-Ray Photoelectron Spectroscopy equipped with a single-channel detector, employing Mg Kα radiation (1253.6 eV, anode operated at KV mA). Ru (3d) spectra were recorded with the analyzer in constant pass-energy mode (pass energy at 50 eV). The referencing of the binding energy (BE) scale is complicated by the superposition of the C (1s) and Ru (3d) signals. Therefore, C (1s) had to be included into fits of the Ru (3d) signal shape, its binding energy was set to 284.5 eV. The Ru (3d) spin-orbit coupling energy (Ru (3d3/2)/(Ru (3d5/2) BE deference) was mostly kept at 4.1±0.05. The area ratio between the Ru (3d3/2) and Ru(3d5/2) components was kept at 0.65±0.03 [16]

4. Effect of Microwave Frequency on NH$_3$ Yield

Figure 3:
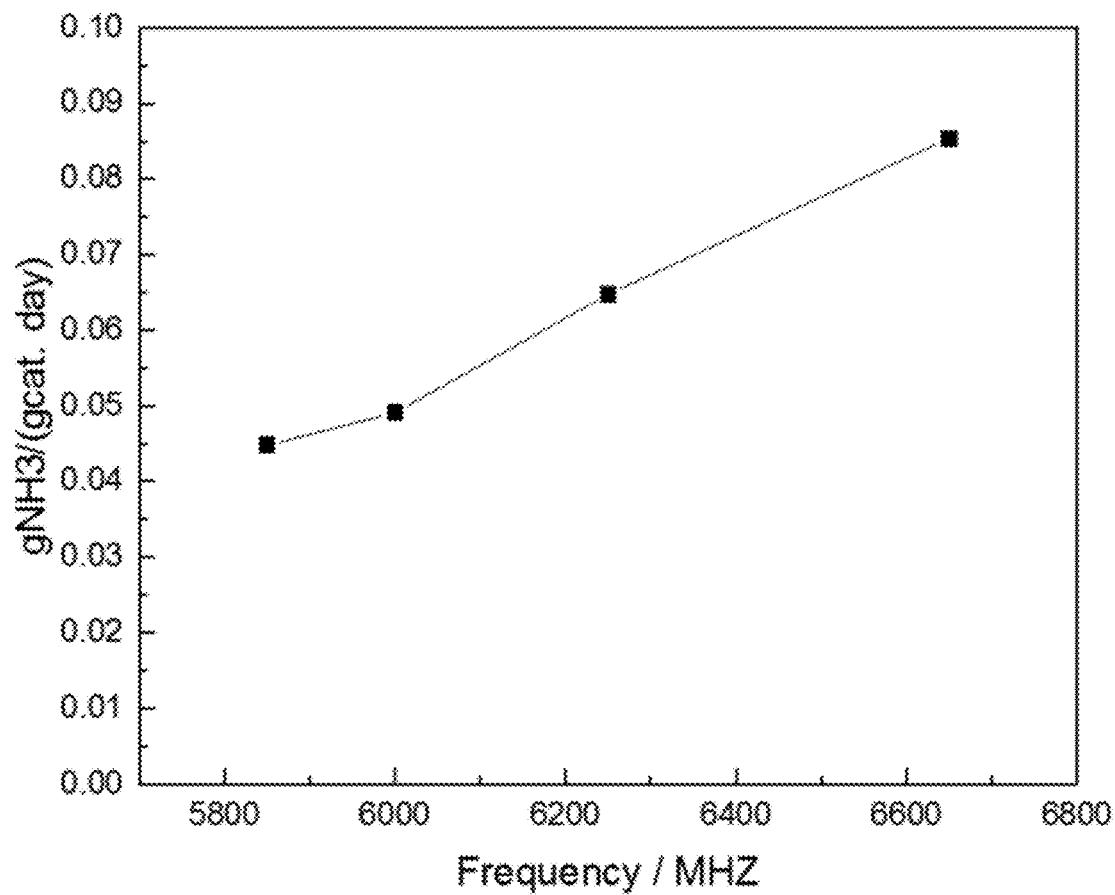
FIG. 3 shows representative for the effect of microwave frequency on the $NH_3$ yield in a disclosed process using different disclosed heterogeneous catalysts. Briefly.

The effect of the applied frequency on the yield of synthesized NH$_3$ is presented in FIG. 3 for a representative heterogeneous catalyst (4 wt % Ru/γ-Al$_2$O$_3$) carried out at a reaction temperature of 280° C. and GHSV=5000 h$^{-1}$ Referring to FIG. 3, the data suggest that the applied frequency influences the yield of synthesized NH$_3$. In the figure, the data show that NH$_3$ yield increased continuously from 0.04 to 0.86 g NH$_3$/(gcat.·day) as the increase of the frequency from 5850 to 6650 MHZ (5850, 6000, 6625, 6650 MHZ).

5. Effect of Catalyst Composition

Figure 4A:
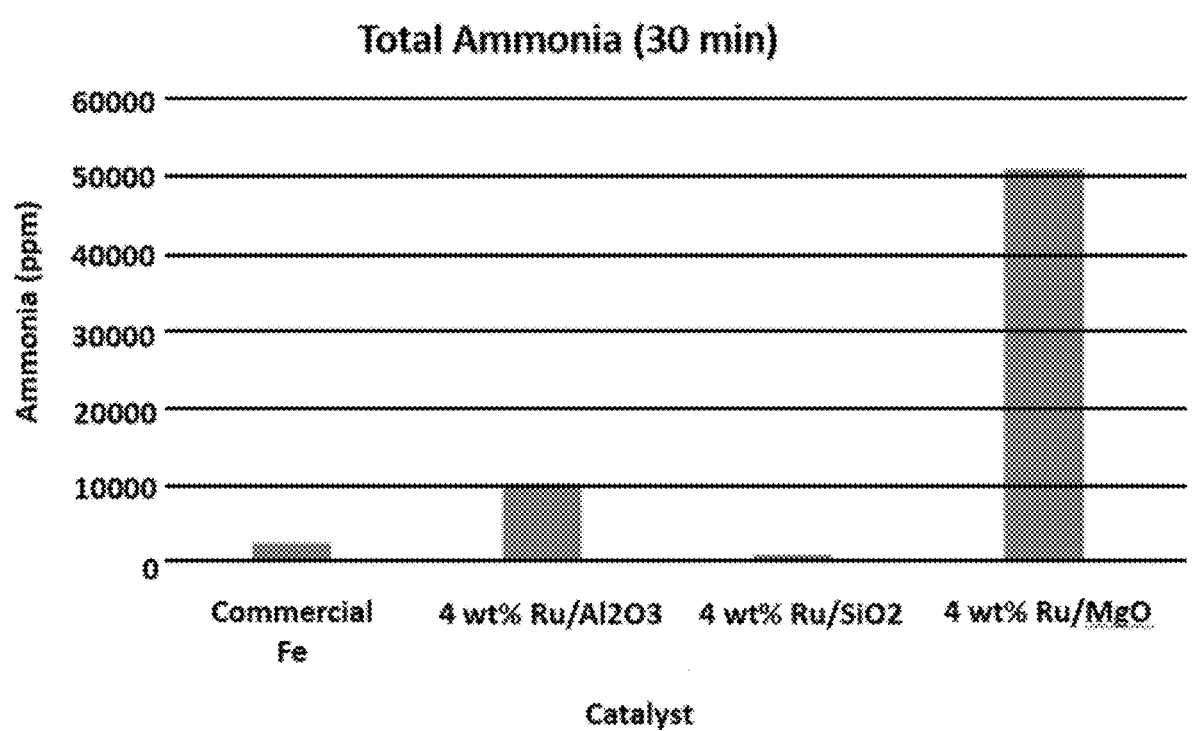
FIGS. 4A-4B each show representative data for the effect of different disclosed catalysts on indicated operational parameters.

In this example, the effect of catalyst composition on ammonia yield was investigated. Referring to FIG. 4A, the effect of metal oxide support was examined and compared to a conventional H-B Fe catalyst. Catalysts comprising 4 wt % ruthenium and three support materials were examined: alumina (Al$_2$O$_3$), magnesium oxide (MgO), and silica (SiO$_2$). The reaction was carried out at atmospheric pressure and at 300° C., with 100 sccm of total flow of the reactant gas mixture. The data in FIG. 4A shows the total ammonia produced by the catalysts under these reaction conditions as measured by the micro GC.

Under these reaction conditions, the conventional H-B Fe catalyst only produced on average 80 ppm and only slightly increased to around 100 ppm at higher temperatures. In contrast, a disclosed catalyst, the Ru/alumina, produced 5× more ammonia than the conventional H-B Fe catalyst and was able to remain at 300 W for each temperature setpoint. The catalysts using either alumina (Al$_2$O$_3$) or magnesium oxide (MgO) showed significantly enhanced ammonia production compared to the conventional H-B Fe catalyst.

For a disclosed catalyst to work well in a microwave driven reaction, it must absorb microwaves at the applied frequency. The disclosed catalysts and processes for making same offer a synthetic approach to fabricating tunable, microwave-absorbing supports, e.g., Al$_2$O$_3$, using promoter materials. For example, a sol-gel process can be used to hydrolyze aluminum isopropoxide, Al(OPr)$_3$, into a gel in which varying amounts of alkali metal nitrate salts (MNO$_3$; M=Li, Na, K) are dissolved. After gelation, the material was calcined at 500° C. to convert it to Al$_2$O$_3$. Calcination also eliminates the nitrate as NO$_x$ and leaves the alkali metal behind as a defect in the alumina lattice: Al—O$^-$ . . . M$^+$.

Without wishing to be bound by a particular theory, this ionic defect site is expected to generate a Debye-type loss process that leads to effective heating.

Figure 4B:
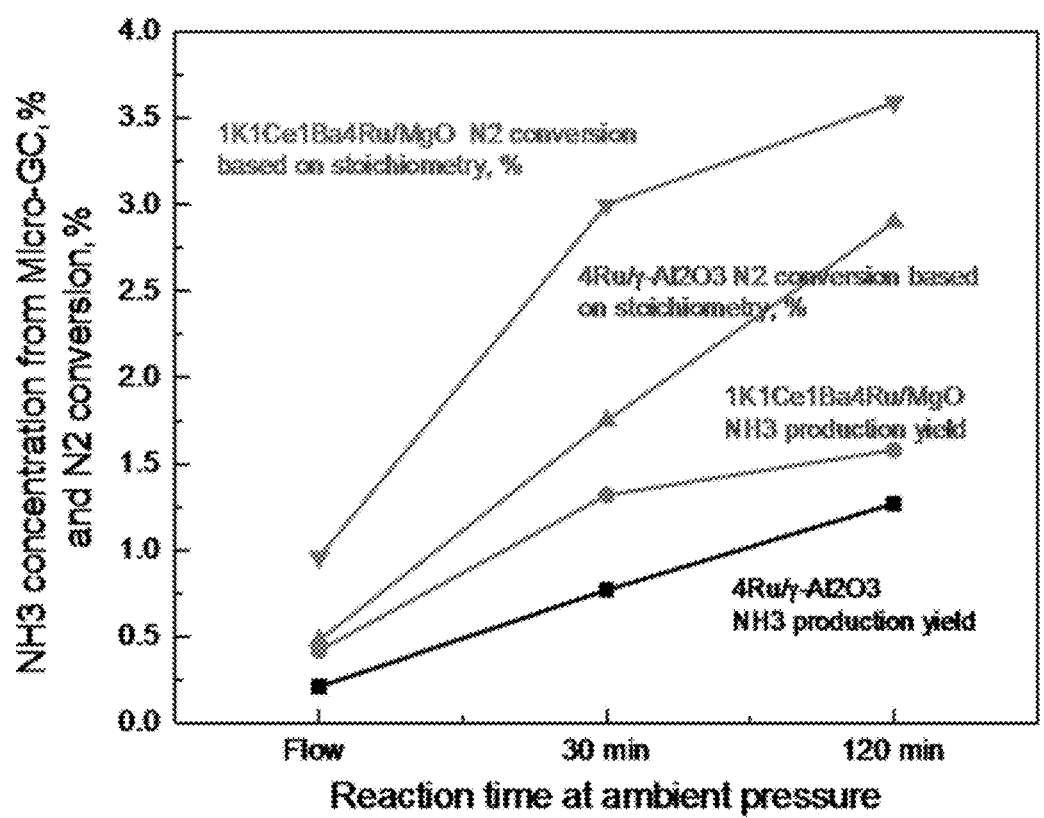

The effect of heterogeneous catalyst composition on ammonia yield was further examined, and representative data are shown in FIG. 4B. The performance of two different catalysts, 4 wt % Ru/MgO and 4 wt % Ru/Al$_2$O$_3$, with and without comprising KCeBa-promoter materials under reaction conditions of ambient pressure, reaction temperature of 280° C., microwave only with no plasma generation. The data show that the presence of promoeter materials can further increase the efficiency of ammonia product. The use of promoters (K, Ce, Ba) have strong impact on the electron transfer between nitrogen and catalyst especially under microwave irradiation.

6. Effect of Pulsing Microwave Energy

Figure 5:
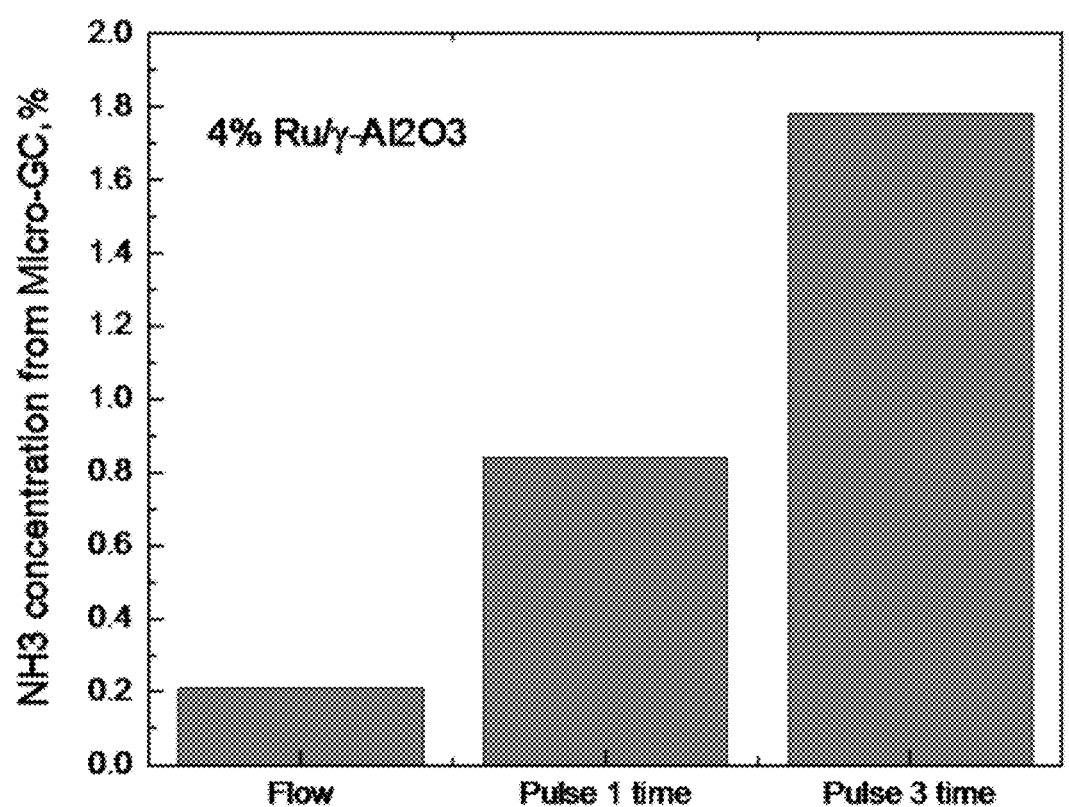
FIG. 5 shows representative data for ammonia yield under microwave pulsing conditions (batch mode) compared to microwave only condition (flow mode at ambient pressure and 280° C.).

In this example, ammonia yield was evaluated under microwave plasma pulsing conditions (batch mode) versus microwave only conditions (flow mode, no plasma, ambient pressure and 280° C.). The 180 W VFM reactor used in this example is capable of operating in either continuous or pulsing mode. As shown in FIG. 5, the results indicate that in microwave-only configuration (no plasma generation), about 0.2% ammonia yield was obtained. When plasma was generated, pulsing microwave energy lead to 1.8% ammonia yield—a yield is several orders of magnitude higher than those reported for conventional methods. Pulsing microwave energy is an energy savings approach. Without wishing to be bound by a particular theory, once the molecules are activated on catalyst surface, microwave irradiation can be reduced.

7. Effect of Reactant Gas Flow Rate on NH$_3$ Yield

Figure 6:
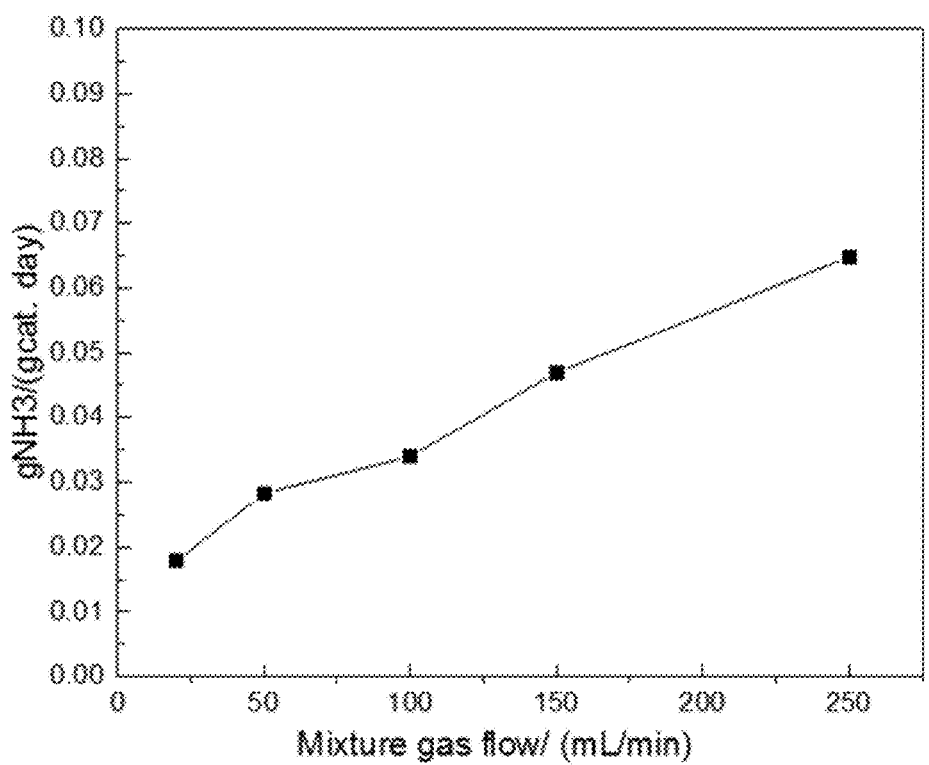
FIG. 6 shows representative data for the effect of gas flow rate on ammonia yield using a disclosed heterogeneous catalyst (4 wt % $Ru/Al_2O_3$) under reaction conditions of ambient pressure, 260° C. and microwave only at 5.85 GHz with no plasma generation.

The effect of reactant gas mixture (H$_2$/N$_2$=3:1) flow rate on ammonia productivity was investigated. As shown in FIG. 6, ammonia productivity linearly increased as flow rate was increased.

8. Effect of Reaction Temperature on NH$_3$ Yield

Figure 7:
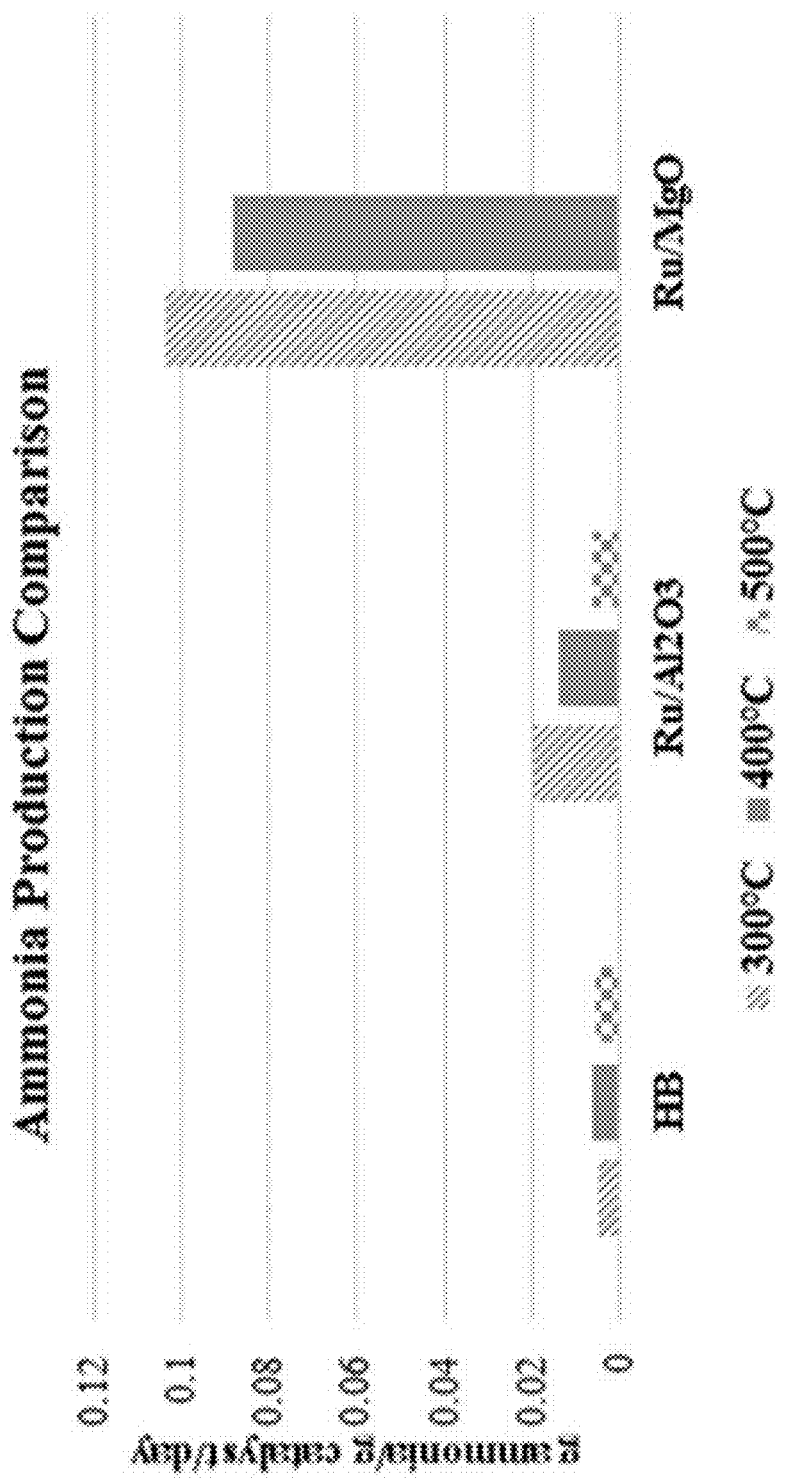
FIG. 7 shows representative data for the effect of temperature yield of ammonia for different disclosed heterogeneous catalyst compositions, as indicated in the figure compared to a conventional H-B Fe catalyst. The data were obtained under reaction conditions of ambient pressure, GHSV=5000 $h^{-1}$, and microwave energy having a frequency of 2.45 GHz.

In this example, the effect of reaction temperature on the NH$_3$ yield was evaluated for a disclosed catalyst (4 wt % Ru/Al$_2$O$_3$ and 4 wt % Ru/MgO) at the indicated temperatures, GHSV=5000 h$^{-1}$, and microwave energy at a frequency of 2450 MHZ. The disclosed catalysts were compared to a conventional Haber-Bosch Fe catalyst, indicated in the figure as "HB." The effect of reaction temperature on the yield of synthesized NH$_3$ is shown in FIG. 7. The data suggest that NH$_3$ yield decreased as the catalyst temperature increased. It is possible, without wishing to be bound by a particular theory, that the NH$_3$ can undergo dissociation or decomposition as the reaction temperature increases, in part, due to the ammonia synthesis reaction being an exothermal reaction. In a further experiment, it was determined that NH$_3$ (25% NH$_3$ in Ar) started to decompose at 200° C. and fully decomposed at 360° C. in the presence of the same 4 wt % Ru/γ-Al$_2$O$_3$ catalyst (data not shown).

9. Catalyst Stability

Figure 8:
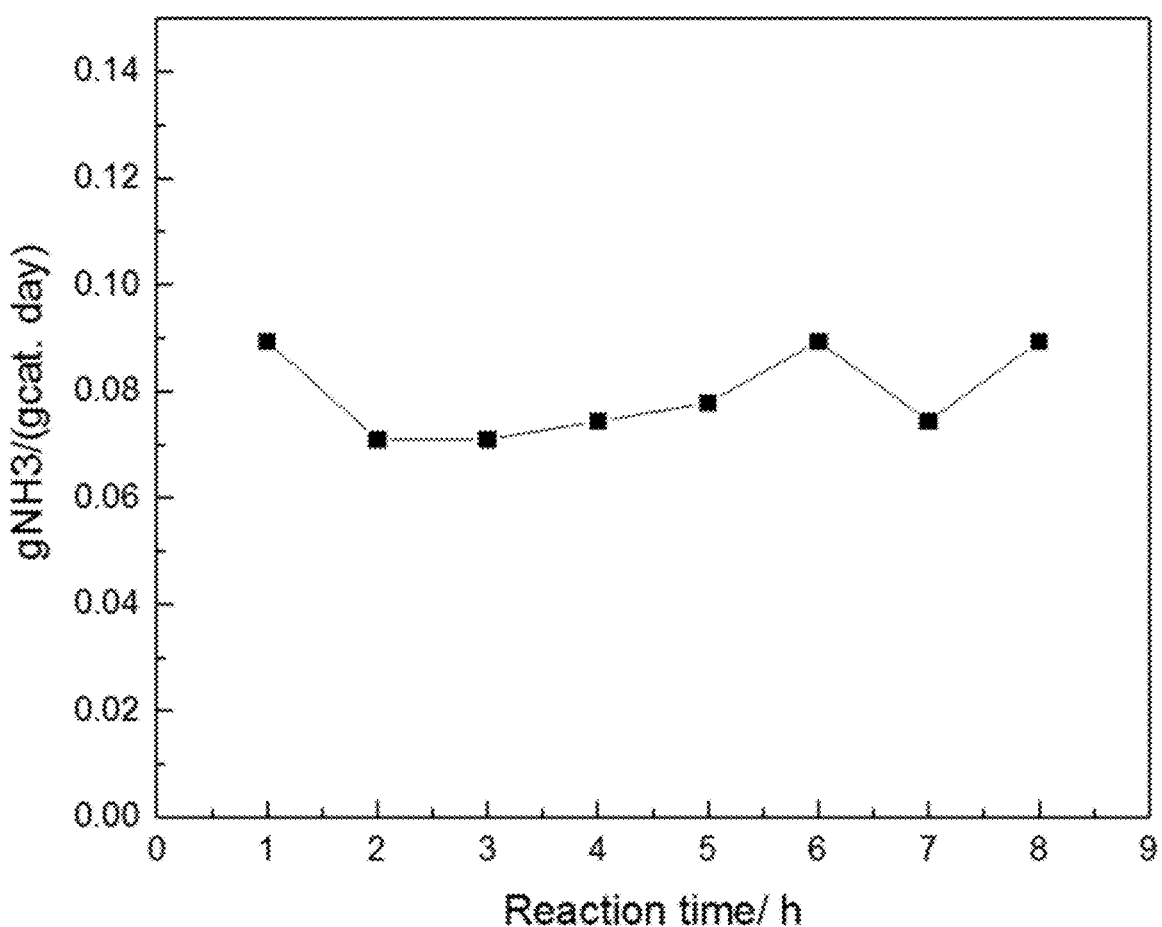
FIG. 8 shows representative data the catalytic performance stability of a representative disclosed catalyst (4 wt % Ru/y-$Al_2O_3$ catalyst) for a reaction carried out at a reaction temperature of 280° C., microwave energy at a frequency of 6650 MHZ, and GHSV=5000 $h^{-1}$. The product gas was sampled every one hour as shown.

Referring to FIG. 8, data are shown regarding the catalyst stability of a disclosed catalyst (4 wt % Ru/γ-Al$_2$O$_3$). Briefly, the reaction was carried out continuously over a period of 8 hours at a reaction temperature of 280° C., GHSV=5000 h$^{-1}$, and microwave energy at a frequency of 6650 MHz, with sample collection time every hour during the study. The data show that NH$_3$ production during the 8 reaction hour was ranged from 0.071 to 0.09 gNH$_3$/(gcat.·day), indicating robust stability for the catalyst during this time period for ammonia production under microwave.

Referring to FIGS. 9A-9D, the data in this example pertain to the durability of a disclosed catalyst (4 wt % Ru/MgO). In this study, the experimental conditions were as follows: reaction temperature of 320° C., and microwave energy at 300 W. The test was conducted over a period of two days. The first day consisted of a 2 hour reduction at 250° C. and a 10-hour test at 320° C. The catalyst was kept under an inert gas overnight to prevent oxidation and the test was resumed the next day for 14 hours. The real time ammonia production as measured by the GC, along with the corresponding temperatures were recorded and the data are shown in FIGS. 9A-9D. Referring to FIG. 9B, on Day 1, the catalyst took approximately 30 minutes to reach a stable equilibrium after the temperature was set at 320° C. The ammonia production (FIG. 9A) can be seen to follow the temperature curve. The catalyst stabilized to an output of 2400 ppm of ammonia for the full 10 hours.

Once the microwave was restarted the next day (FIGS. 9C and 9D), the ammonia production almost instantaneously returned to its output of 2400 ppm. At about 8 hours into the test, the catalyst began to lose absorption and the temperature dropped (FIG. 9D), which correlated with a drop in the ammonia production (FIG. 9C). Without wishing to be bound by a particular theory, this may have been caused by structural changes within the catalyst such as sintering of the ruthenium. The power was increased after the temperature drop to 400 W, and the temperature quickly returned to expected levels with production of ammonia also returning 2400 ppm production until the end of the test (FIGS. 9C and 9D).

10. Performance Stability with Power Interruption

Figure 10:
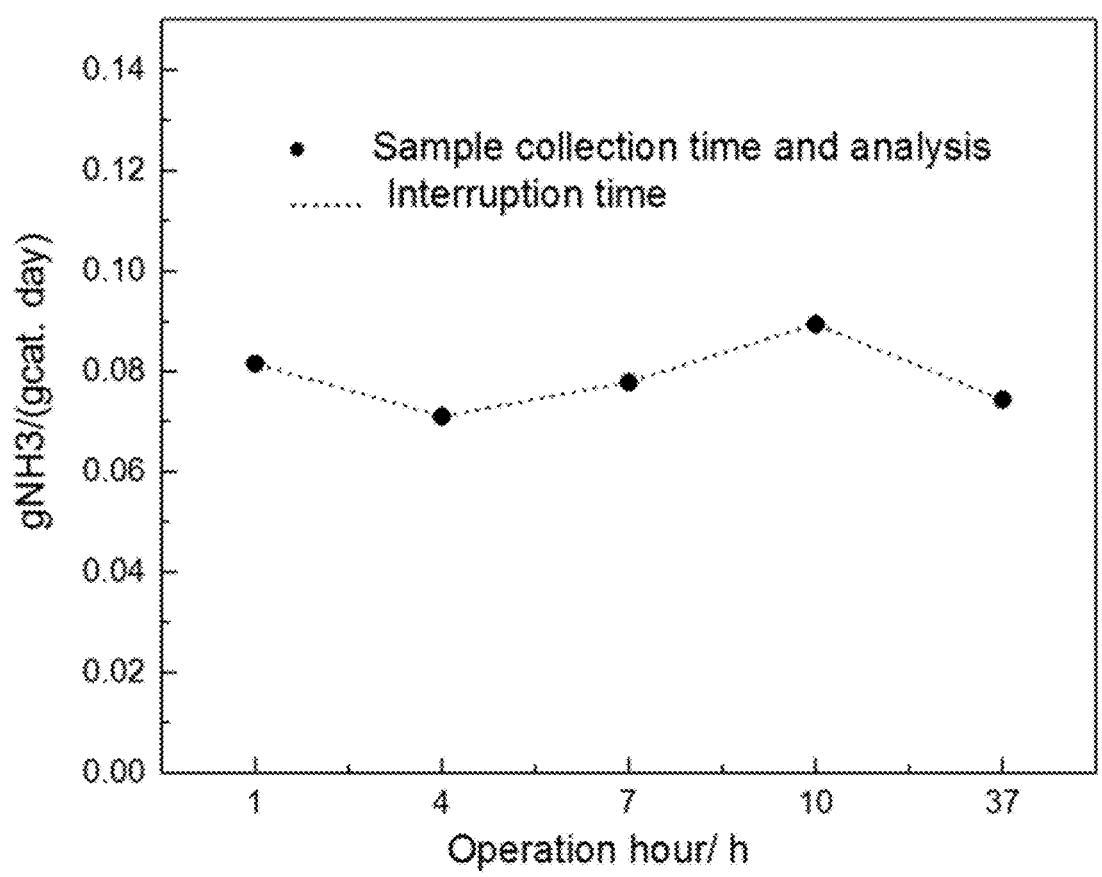
FIG. 10 shows representative performance stability data for $NH_3$ production under operating conditions involving power interruption. Briefly, the reaction was carried out at a reaction temperature of 280° C., microwave energy at a frequency of 6650 MHZ, and GHSV=5000 $h^{-1}$. Cycle 1: sample collection time 1 h, interruption time 2 h; Cycle 2: sample collection time 1 h, interruption time 2 h; Cycle 3.

The NH$_3$ production performance stability under power interception was studied for five cycles and the results were described in FIG. 10. Briefly, the experimental conditions were as follows: reaction temperature of 280° C., microwave energy having a frequency of 6650 MHz, and GHSV=5000 h$^{-1}$. Samples were collected each hour. The cycles were as follows: Cycle 1: sample collection time 1 h, interruption time 2 h; Cycle 2: sample collection time 1 h, interruption time 2 h; Cycle 3: sample collection time 1 h, interruption time 2 h; Cycle 4: sample collection time 1 h, interruption time 26 h; Cycle 5: sample collection time 1. The data in FIG. 11 show that NH$_3$ production was between 0.071 and 0.09 gNH$_3$/(gcat.·day) during the five cycles covering varied power interruption period. The data show that there was no apparent performance degradation under non-steady supply of electricity in VFM reactor (five cycles with interruption time≥1 hour) and the catalysts were steady stable.

11. Effect of Reaction Time (Batch Production Mode)

The production of ammonia is an exothermic, molecular decrease, and reversible process as shown in Equation 1. According to Le Chatelier's Principle, the lower temperature and higher pressure benefit ammonia production. In order to achieve as much ammonia as possible in the equilibrium mixture, a low temperature should be applied. However, the lower the temperature is, the slower the reaction becomes. It is not economic to reach the equilibrium yield (the highest yield) by sacrificing a lot of time. In industry using conventional HB processes, a temperature of 400-450° C. is a compromise temperature producing a reasonably high proportion of ammonia in the equilibrium mixture (even if it is only 15%), but in a very short time. Considering the pressure effect, higher pressure favors the reaction which produces fewer molecules (more ammonia). Because the increased pressure brings the molecules closer together, resulting in higher chances of hitting and sticking to the surface of the catalyst where they can react. However, the higher the pressure results higher performance specifications for pipes and containment vessels, and thereby leading to an increased capital cost to build and maintain a conventional HB process plant.

In industry using conventional HB processes, the pressure of 197 atm (200 bar) is also a compromise pressure chosen on economic grounds. Since it is a reversible reaction, a dynamic equilibrium will form, therefore, it is impossible to obtain 100% yield of $NH_3$ even if the theoretical stoichiometric reactant volume/mole ratio of $N_2:H_2$ of 1:3 is applied.

Therefore, in this study, the effect of reaction time on $NH_3$ concentration under at 280° C. has been investigated and the results were shown in FIG. 11A. With the increase of the reaction time (flow, 10, 30, 60, 120 min) in the simple batch reaction, the ammonia concentration increased gradually from 0.2% to 1.27% (FIG. 11A). The corresponding nitrogen conversion increased from 0.47 to 2.88% and hydrogen conversion increased from 0.46 to 2.81% (FIG. 11B). Therefore, $NH_3$ concentration is much less from equilibrium yield under ambient pressure and temperature of 280° C. in the continuous fixed-bed reaction.

12. Catalyst Characterization $H_2$-TPR was applied to study the properties of ruthenium species in the catalyst and the data are shown in FIG. 12. The TPR profile of a disclosed catalyst (4 wt % Ru/γ-$Al_2O_3$) showed a major peak with Tm (temperature at peak maximum) at 200° C. and a shoulder at 146° C. The high temperature TPR peak was assigned to the reduction of the bulk $RuO_2$ species, while the low temperature peak was attributed to the reduction of well-dispersed RuOx species (Ref. No. 17).

FIG. 13 shows the XRD patterns of a disclosed catalyst (4 wt % Ru/γ-$Al_2O_3$) in both oxidized and reduced states was measured under ambient conditions. XRD patterns of the oxidized catalysts show only the diffraction peaks attributed to $RuO_2$ phase (28.1, 35.1, and 54.3°). After reduction with $H_2$ at 400° C. for 6 h, the XRD of $RuO_2$ disappeared and only showed the diffraction peaks of metallic Ru phase (2θ=42.2, 44.0, 58.3, and 69.4°) (see Ref. No. 18). XRD results confirmed that the oxidized 4 wt % Ru/γ-$Al_2O_3$ catalyst has been fully reduced at the temperature of 400° C. for 6 h.

XPS spectra of a disclosed catalyst (4 wt % Ru/γ-$Al_2O_3$) were obtained in a reducing $H_2$ atmosphere and the data are shown in FIG. 14. The two peaks located at the binding energy of 279.54 and 283.64 eV can be assigned to Ru metal 3d5/2 and 3d3/2, respectively, indicating that ruthenium in this catalyst have been completely reduced (Ref. No. 19). The XPS results were consist with the XRD pattern and $H_2$-TPR result, namely, oxidized 4 wt % Ru/γ-$Al_2O_3$ catalyst can be fully reduced at 400° C. for 6 h. Due to carbons source from air, there are two C1s peaks centered at the binding energy of 284.86 and 288.30 eV attributed to C1s (C—C and O—C=O).

SEM images were obtained for a disclosed catalyst (4 wt % Ru/γ-$Al_2O_3$) and the images are shown in FIGS. 15A-15B. The images show that the surfaces of the Ru/γ-$Al_2O_3$ catalysts were covered with Ru flakes and the catalysts were comprised of large pores constructed by plate structure (Ref. No. 20).

A reduced disclosed catalyst (4 wt % Ru/γ-$Al_2O_3$) was observed by TEM and the images are shown in FIGS. 16A-16B. The TEM image showed the presence of many black and dispersed Ru particles, which are uniform in size and shape as well as well dispersed on the surface of γ-$Al_2O_3$ (FIG. 16A). The particle size distribution of Ru particles was obtained by counting 200 particles observed by TEM and the data are shown in FIG. 16B. The average particle size (d) of Ru particles supported on γ-$Al_2O_3$ was 4.25 nm. This particle size was similar to the reported result of 4.3 nm for the mean particle size of Ru on y-$Al_2O_3$ support though various preparation method and Ru precursor were applied (Ref. No. 21).

The disclosed heterogeneous catalysts have been shown herein to be capable of catalyzing ionization and dissociation of $N_2$ and $H_2$ molecules to form a large number of activated species to generate $NH_3$ molecular, e.g., achieving 0.86 $gNH_3$/(gcat.·day) under disclosed experimental conditions such as a reaction temperature of 280° C., frequency of 6650 MHz and GHSV of 5000 $h^{-1}$. The catalyst performance stability under both continuous reaction and power interruption was demonstrated with a stable $NH_3$ yield ranging 0.071-0.09 $g_{NH3}/(g_{catalyst}·day)$. Although, in the data disclosed herein, $NH_3$ yield was not at the equilibrium concentration in the continuous reaction, it is likely that this is due to the short reaction time used and that this can be improved with lengthier reaction or residency times of the reactant gas mixture in contact with the catalyst.

It will be apparent to those skilled in the art that various modifications and variations can be made in the present disclosure without departing from the scope or spirit of the disclosure. Other aspects of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A process for the synthesis of ammonia, comprising:
   providing a reaction chamber with a heterogeneous catalyst;
      wherein the heterogeneous catalyst comprises a metal selected from Group 7, Group 8, Group 9, Group 10, Group 11, or combinations thereof; wherein the metal is present in an amount from about 0.1 wt % to about 20 wt % based on the total weight of the heterogeneous catalyst; and a metal oxide support;
      wherein the reaction chamber has a pressure of about 1 atm to about 20 atm;
   conveying a flow of a reactant gas mixture into the reaction chamber via an entry port;
      wherein the reactant gas mixture comprises nitrogen and hydrogen;
   contacting the reactant gas mixture and the heterogeneous catalyst;
   heating the heterogeneous catalyst using microwave energy, thereby providing a product gas mixture; and
      wherein the product gas mixture comprises ammonia;
   conveying the product gas mixture from the reaction chamber via an exit port.

2. The process of claim 1, wherein the metal is selected from ruthenium, rhodium, palladium, osmium, iridium, platinum, iron, cobalt, manganese, or combinations thereof.

3. The process of claim 1, wherein the metal is ruthenium; and wherein the ruthenium is present as ruthenium (0), ruthenium (II), ruthenium (III), ruthenium (IV), or combinations thereof.

4. The process of claim 1, wherein the metal is present in an amount from about 0.5 wt % to about 10 wt %.

5. The process of claim 1, wherein the metal oxide support comprises MgO, $Al_2O_3$, $SiO_2$, $TiO_2$, $ZrO_2$, or combinations thereof.

6. The process of claim 1, the heterogeneous catalyst further comprising a promoter material in an amount of about 0.1 wt % to about 5 wt % based on the total weight of the heterogeneous catalyst; wherein the promoter material comprises a Group I compound, a Group II compound, a lanthanide compound, or combinations thereof; and wherein when a combination of promoter materials is present, each is present in an amount independent of any other promoter material.

7. The process of claim 5, wherein the promoter material is present in an amount of about 0.1 wt % to about 5 wt % based on the total weight of the heterogeneous catalyst; wherein the promoter material comprises an oxide of K, Ce, Ba, or combinations thereof.

8. The process of claim 1, wherein the heterogeneous catalyst has an average particle size (d) of about 0.5 nm to about 30 nm.

9. The process of claim 1, wherein the reactant gas mixture comprises about 15 vol % to about 25 vol % of nitrogen; and about 45 vol % to about 75 vol % of hydrogen; provided that the vol % ratio of nitrogen to hydrogen is about 1 to about 5 and the total vol % of all gases in the reactant gas mixture is equal to about 100 vol %.

10. The process of claim 1, wherein the vol % ratio of hydrogen to nitrogen is about 2 to about 5.

11. The process of claim 10, wherein the vol % ratio of hydrogen to nitrogen is about 2.5 to about 3.5.

12. The process of claim 1, wherein the heating the reaction chamber is using microwave energy having at a frequency of about 1 MHz to about 50 GHz.

13. The process of claim 1, wherein the product gas mixture has an ammonia concentration of about 10 ppm to about 30 vol %.

14. The process of claim 1, wherein the process yields ammonia at about 0.001 $g_{NH3}/(g_{catalyst} \cdot hour)$ to about 2.0 $g_{NH3}$ ($g_{catalyst} \cdot hour$).

15. The process of claim 1, further comprising reducing the heterogeneous catalyst prior providing the reaction chamber with the heterogeneous catalyst.

16. The process of claim 15, wherein the reducing the heterogeneous catalyst comprises conveying a flow of a first reducing gas comprising $H_2$ such that the first reducing gas comprising $H_2$ contacts the heterogeneous catalyst; and heating the heterogeneous catalyst at a first catalyst reducing temperature from about 100° C. to about 1,000° C. for first catalyst reducing period of time sufficient to reduce at least 80 wt % of the ruthenium to ruthenium (0).

17. The process of claim 15, wherein the first catalyst reducing period of time is about 1 min to about 12 hours.

18. The process of claim 1, further comprising reducing the heterogeneous catalyst in the reaction chamber prior to conveying the flow of the reactant gas mixture into the reaction chamber.

19. The process of claim 18, wherein the reducing the heterogeneous catalyst comprises conveying a flow of a second reducing gas comprising $H_2$ such that the second reducing gas comprising $H_2$ contacts the heterogeneous catalyst; and heating the heterogeneous catalyst using microwave energy at a second catalyst reducing temperature from about 100° C. to about 1,000° C. for second catalyst reducing period of time sufficient to reduce at least 80 wt % of the ruthenium to ruthenium (0).

20. A process for the synthesis of ammonia, comprising:
providing a reaction chamber with a heterogeneous catalyst;
wherein the heterogeneous catalyst comprises:
(a) a metal selected from Group 7, Group 8, Group 9, Group 10, Group 11, or combinations thereof; wherein the metal is present in an amount from about 0.1 wt % to about 20 wt % based on the total weight of the heterogeneous catalyst; and a metal oxide support; and
(b) a promoter comprising an oxide of K, an oxide of Ba and an oxide of Ce;
wherein each promoter material is present independently in an amount of about 0.1 wt % to about 5 wt % based on the total weight of the heterogeneous catalyst;
wherein the reaction chamber has a pressure of about 2 torr to about 20 atm;
conveying a flow of a reactant gas mixture into the reaction chamber via an entry port;
wherein the reactant gas mixture comprises nitrogen and hydrogen;
contacting the reactant gas mixture and the heterogeneous catalyst;
heating the heterogeneous catalyst using microwave energy, thereby providing a product gas mixture; and
wherein the product gas mixture comprises ammonia;
conveying the product gas mixture from the reaction chamber via an exit port.

* * * * *